US012205480B2

(12) United States Patent
Schuppenhauer et al.

(10) Patent No.: US 12,205,480 B2
(45) Date of Patent: Jan. 21, 2025

(54) METHOD AND SYSTEM FOR CONTROLLING FLIGHT MOVEMENTS OF AIR VEHICLES

(71) Applicant: Skyroads AG, Munich (DE)

(72) Inventors: Ralf Schuppenhauer, Bonn (DE); Robert Stancel, Berlin (DE); Klaus Frühwirth, Graz (AT); Corvin Huber, Munich (DE); Otto Bommer, Karlsruhe (DE)

(73) Assignee: SKYROADS AG, Munich (DE)

( * ) Notice: Subject to any disclaimer, the term of this patent is extended or adjusted under 35 U.S.C. 154(b) by 0 days.

(21) Appl. No.: 18/002,498

(22) PCT Filed: Jun. 25, 2021

(86) PCT No.: PCT/EP2021/067484
§ 371 (c)(1),
(2) Date: Dec. 20, 2022

(87) PCT Pub. No.: WO2021/260174
PCT Pub. Date: Dec. 30, 2021

(65) Prior Publication Data

US 2023/0237917 A1 Jul. 27, 2023

(30) Foreign Application Priority Data

Jun. 26, 2020 (WO) ................. PCT/EP2020/068050

(51) Int. Cl.
*G08G 5/00* (2006.01)
*G08G 5/04* (2006.01)

(52) U.S. Cl.
CPC ......... *G08G 5/0043* (2013.01); *G08G 5/0013* (2013.01); *G08G 5/0026* (2013.01); *G08G 5/0039* (2013.01); *G08G 5/045* (2013.01)

(58) Field of Classification Search
CPC .. G08G 5/0043; G08G 5/0013; G08G 5/0026; G08G 5/0039; G08G 5/045; G08G 5/0052
See application file for complete search history.

(56) References Cited

U.S. PATENT DOCUMENTS 8,630,790 B1 * 1/2014 Bailey .................. G08G 5/0039 701/120
9,171,473 B1 * 10/2015 McNally ............. G08G 5/0095
(Continued)

FOREIGN PATENT DOCUMENTS

WO 2004008415 A1 1/2004
WO 2018178759 A1 10/2018

*Primary Examiner* — Kenny Nguyen
(74) *Attorney, Agent, or Firm* — Maginot, Moore & Beck, LLP

(57) ABSTRACT

An air vehicle control system (1) and method for operation of one or more air vehicles, AVs, (2) flying along flight routes (FR) assigned to the air vehicles, AVs, (2) by said air control system (1) according to a calculated flight route plan, FRP, within a predefined airspace, wherein an air flight guarding control unit (3) integrated in the air vehicle, AV, (2) is adapted to intervene automatically with flight controls of the air vehicle, AV, (2) on the basis of a monitored flight status of the air vehicle, AV, (2) such that the air vehicle, AV, (2) is kept during a flight movement within three-dimensional confines or boundaries of the assigned flight route (FR) and collisions with other air vehicles, AVs, (2) or with other obstacles are avoided.

31 Claims, 12 Drawing Sheets

(56) References Cited

U.S. PATENT DOCUMENTS

| | | | | |
|---|---|---|---|---|
| 9,886,862 | B1 * | 2/2018 | Burgess | H04W 4/40 |
| 10,037,704 | B1 * | 7/2018 | Myr | G08G 5/0026 |
| 10,074,283 | B1 * | 9/2018 | de Oliveira | G08G 5/0026 |
| 10,467,913 | B1 * | 11/2019 | Suiter | G08G 5/025 |
| 10,553,123 | B2 * | 2/2020 | Pesik | G01S 13/933 |
| 10,580,309 | B2 * | 3/2020 | de Oliveira | G06Q 10/0631 |
| 10,867,519 | B2 * | 12/2020 | Mecklem | G08G 5/0052 |
| 10,937,327 | B2 * | 3/2021 | Cohen | G08G 5/045 |
| 11,282,398 | B1 * | 3/2022 | Watson | G08G 5/0039 |
| 11,308,814 | B2 * | 4/2022 | Fujii | H04B 7/18504 |
| 11,531,357 | B1 * | 12/2022 | Nielsen | G05D 1/102 |
| 11,636,769 | B1 * | 4/2023 | Watson | G08G 5/045 340/963 |
| 11,935,420 | B1 * | 3/2024 | Suiter | G08G 5/0091 |
| 11,984,036 | B2 * | 5/2024 | Perikala | G08G 5/0013 |
| 2018/0211549 | A1 * | 7/2018 | Cohen | G08G 5/0021 |
| 2018/0218615 | A1 * | 8/2018 | Myr | B64F 1/002 |
| 2018/0253978 | A1 | 9/2018 | Tabuchi | |
| 2018/0261103 | A1 * | 9/2018 | de Oliveira | G08G 5/0039 |
| 2018/0261106 | A1 * | 9/2018 | de Oliveira | G06Q 50/40 |
| 2019/0035287 | A1 | 1/2019 | Priest | |
| 2019/0146083 | A1 * | 5/2019 | Pesik | G08G 5/0021 701/120 |
| 2020/0143691 | A1 * | 5/2020 | Sidiropoulos | G08G 5/0043 |
| 2020/0380874 | A1 * | 12/2020 | Fujii | G08G 5/0013 |
| 2023/0108873 | A1 * | 4/2023 | Watson | G08G 5/0008 340/963 |
| 2023/0260408 | A1 * | 8/2023 | Watson | G08G 5/0052 340/963 |

* cited by examiner

METHOD AND SYSTEM FOR CONTROLLING FLIGHT MOVEMENTS OF AIR VEHICLES

This application is a U.S. National Stage of PCT/EP2021/067484, filed on Jun. 25, 2021, which claims priority to PCT/EP2020/068050, filed on Jun. 26, 2020, the entire disclosure of which is incorporated herein by reference.

The invention relates to a computer implemented method and a system used for controlling the operation of air vehicles in an available airspace.

Conventional air traffic control systems are provided to move air vehicles safely through the available airspace. The airspace comprises two major types of airspace, i.e. a controlled airspace and an uncontrolled airspace. A controlled airspace is actively monitored and managed by human air traffic controllers. To enter such a controlled airspace an air vehicle must first gain clearance from the air traffic controller. In contrast, uncontrolled airspace has no supervision by air traffic controllers so no clearance is required to operate in this airspace. The majority of light aircrafts and helicopters do operate outside or underneath controlled airspaces. Airspace can be further sub-divided into different classes where internationally agreed rules for visual flight and instrument flight apply. For instance, class A forms a high level or route controlled airspace and can be used mainly by commercial passenger jets. Only instrument flight rules (IFR) are permitted in a class A airspace and ATC (air traffic control) clearance is required. All flights in the class A airspace are provided with air traffic control services and are positively separated from each other.

In contrast, class G airspace is an uncontrolled airspace. Both IFR (Instrument Flight Rules) and VFR (Visual Flight Rules) are permitted and neither requires ATC clearance. Class G airspace is used mostly from the surface to the base of other overlying airspaces classes.

Air traffic control (ATC) is a service provided by ground-based air traffic controllers to direct the air vehicle on the ground and through the controlled airspace. Air traffic control can also provide advisory services to air vehicles moving in the non-controlled airspace. The primary goal of the air traffic control ATC is to ensure the safe, orderly and expeditious flow of air traffic. As part of this goal, ATC actively monitors air traffic to prevent a loss of separation between an air vehicle and another air vehicle or the proximity of an air vehicle to an obstacle. Air traffic controllers monitor the current position of the air vehicle in their assigned airspace by radar and can communicate with the pilots flying the air vehicle by radio. To prevent a loss of separation, air traffic control can enforce traffic rules to ensure that each air vehicle maintains a minimum amount of empty space around it at all times. An air traffic controller can also issue instructions that pilots are required to obey or advisories that pilots may at their own discretion regard or disregard. A pilot in command flying the air vehicle is the final authority for the safe operation of the air vehicle and may in particular in an emergency deviate from ATC instructions to the extent required to maintain safe operation of the air vehicle.

A conventional air vehicle control system including air traffic control ATC is well-suited for commercial air vehicles piloted by professional pilots with the assistance of human air traffic controllers communicating with the cockpit crew via a wireless radio channel. However, more and more air vehicles are no longer commanded by a pilot sitting in a cockpit of the air vehicle. Many air vehicles, in particular drones, are remote-controlled by a pilot on the ground. Further, many air vehicles are controlled most of the time by an activated autopilot integrated in the flight control system of the air vehicle. Especially, in a near-ground airspace, the traffic density of such piloted and unpiloted air vehicles does increase significantly. Especially, the number of unmanned air vehicles or drones transporting freight or passengers flying near-ground does increase, especially in the uncontrolled class G airspace. Because of the high number of heterogeneous air vehicles comprising both manned and unmanned air vehicles being controlled either by a professional pilot sitting in the cockpit or a remote pilot located on ground and aircrafts controlled by autopilots, the control of the movement of air vehicles in the airspace becomes increasingly complex and can no longer be handled by a conventional air traffic control system. Especially, in a near-ground airspace, the changing topology of the landscape and buildings further increases the complexity of controlling the movement of the air vehicles in the airspace.

WO 2004/008415A1 describes an avionic system and ground station for aircraft out of route management and alarm communications. An avionic device onboard the aircraft is adapted to send, in a control state, commands to the aircraft's autopilot to take over the control of the aircraft and return it to pre-set flight levels or spatial positions. Sensors on the aircraft are provided to obtain data of the onboard situation transmitted in real time to ground control stations by means of a communication system. The communication system is also used to receive from the ground or from another aircraft appropriate instructions when predetermined events occur. The avionic device is provided to offer a collision avoidance function during flight along an aircraft route but also during take-off and landing where the avionic device creates virtual cones to delimit the air space considering constraints such as ground obstacles. When controlling the aircraft route the on-board avionic device operates based on global authorized minimum cruising altitudes and flight levels in compliance with civil aviation regulations. The aircraft is piloted and comprises a crew with pilots sitting in a cockpit of the aircraft. The pilots and the cockpit can be monitored by means of sensors providing sensor data such as a pilot heart rate or cockpit images via a communication link to a ground station to increase aircraft security.

However, since more and more air vehicles AV flying in an airspace have no pilot on board, such a conventional system is no longer applicable under many circumstances. Air vehicles AVs having no pilots on board—otherwise termed as Unmanned Air Vehicles or UAVs—include drones transporting packets with goods or products from a supplier to a consumer or air taxi drones transporting passengers between locations. Drones are remote controlled by users and pilots situated on ground.

US 2019/0035287 A1 describes an air traffic control system for UAVs for drone collision avoidance. This air traffic control system is only suited for drones and is not applicable for controlling an air space including, AVs piloted by experienced pilots, in particular, professional on-board pilots flying commercial airliners.

With the proliferation of drones and UAVs, air vehicles AVs controlled directly by on-board experienced pilots and/or remote controlled by on-ground pilots or by unexperienced users will have to move alongside and share the same available airspace.

Conventional air traffic control systems such as the avionic system of WO 2004/008415A1 or the drone collision avoidance system as described in US 2019/0035287 A1 do not take into account different levels of freedom for the involved parties, in particular pilots or users. A reason is that the pilots who fly commercial aircrafts for the transportation of freight or passengers, as in the system of WO 2004/008415A1, are highly proficient with considerable flight experience.

In contrast remote controlled drones or air vehicles UAVs receive their flight control commands mostly from less experienced pilots or users. Therefore, for drones a more deterministic approach with UAV flight plans is required as suggested in US 2019/0035287A1 or described in US2018/0253978A1. An unexperienced user may direct its drone on a collision course with another air vehicle AV in the available airspace. In this scenario only a very limited or even no intervention at all by the unexperienced drone pilot (user) is desired, e.g. an autonomous flight without involvement of any human operator, to avoid a detected imminent collision. However, for a difficult flying manoeuvre e.g. under bad weather conditions, a full control of an air vehicle AV by an experienced and certified on board pilot provides for safe collision avoidance or a safe landing thus achieving a maximum flight security.

Accordingly, there is a need to provide an efficient air vehicle control system allowing the safe operation of a plurality of heterogenous air vehicles that are being controlled by on board pilots and/or remote controlled by on ground pilots with differing flight skills and flight experiences.

This object is achieved according to a first aspect of the present invention by an air vehicle control system comprising the features of claim 1. The present invention provides an air vehicle control system for operation of one or more air vehicles, AVs, flying along flight routes (FR) that the control system has assigned to said air vehicles, AVs, according to a flight route plan, FRP, within a predefined airspace, wherein the flight route plan, FRP, is calculated and updated continuously or event driven in real time by the air vehicle control system, wherein an air flight guarding control unit integrated in the air vehicle, AV, is adapted to intervene automatically with flight controls of the air vehicle, AV, according to a flight control intervention constraint level, fciC-L, and potentially also according to other pre-set or derived constraints, C, on the basis of a monitored flight status, MFS, of the air vehicle, AV, such that during a flight movement, the air vehicle, AV, is kept within dynamic three—dimensional spatial confines or air track boundaries (B) of air track segments (ATS) of an air track (AT) belonging to the assigned flight route (FR) to avoid collisions with other air vehicles, AVs, or with other obstacles in the controlled airspace, wherein the flight control intervention constraint level, fciC-L, comprises a pre-set or adjustable flight control intervention constraint level indicating an extent of intervention of the air flight guarding control unit with the flight controls of the air vehicle, AV.

In a preferred embodiment the air track (ATs) assigned to an air vehicle AV can be dynamically changed during flight of the air vehicle, AV, based on variable constraints or variable parameters.

The variable constraints or parameters can comprise relevant, constantly variable parameters such as static and dynamic obstacles, range and battery level status, weather data such as wind and precipitation conditions, magnetic fields, etc.

A key idea of the present invention is to provide experienced users or pilots with maximum freedom during movement by means of the air vehicle, AV, in a given airspace, and to intervene only if the flight security is lowered, in particular when the safety or wellbeing of others, i.e. transported passengers or other participating parties is compromised. This entails also a timely blocking of critical airspace where the air vehicle, AV, could possibly fly into within a scheduled time window or travel time slot TTS. Each air track AT can comprise one or more air track segments, ATS dividing virtually the air track from the start position to destination position along the flight path. A travel time slot TTS can be assigned to each air track segment ATS. If the air track AT comprises a single air track segment ATS the flight route FR has a single travel time slot TTS corresponding to the total flight time between the start time at the start position and the arrival time at the destination position. The travel time slot TTS is dynamic, i.e. it can be changed by the system in interaction with other AVs, and the flight path and the associated travel time slots ATSs are only blocked during the time when they are actually needed, not before and after (in space and time) as done by conventional, less flexible/freedom providing systems. While planning of flight routes FRs does support an efficient air traffic management, the air vehicle control system according to the present invention may at any given time allow for some admissible deviation from this flight route FR, in particular if a capable experienced pilot wishes to do so, as long as this deviation is safe and does not inconvenience others or is in contradiction with other constraints C. The remaining flight route FR of the air vehicle AV is continuously refreshed accordingly.

This gradual operational freedom can be granted by the air vehicle control system in terms of a number of parameters and pre-set or derived constraints C which can be in space such as a landscape envelope or a collision course with another air vehicle, AV, or in time such as no-fly times e.g. at night. The constraints C can also comprise more abstract constraints C such as using acceleration levels of on board actuators to avoid travel sickness.

The proficiency of a pilot may be derived by a control centre from proficiency certificates such as a pilot license stored in a system database. The proficiency of the pilot of an air vehicle AV can in an alternative implementation also be detected in real time by an AI algorithm running on an artificial intelligence module AIM detecting irregular behavior of the pilot such as observed tiredness of the pilot. Surroundings and traffic situations, such as crowdedness, openness of a current position, vicinity to other air vehicles AVs and their operation behaviour or settings, or vehicle capabilities of the air vehicle AV including its power consumption and/or range relative to a remaining distance to a point of arrival of the assigned flight route FR can also be taken into account. In a possible embodiment the air vehicle control system may intervene only as much as necessary within the limits allowed by the constraints C to maintain a maximum sense of freedom to the pilot.

In contrast to most conventional air traffic control systems the flight control intervention is not performed in response to a human intervention by an onboard pilot advised by a human air traffic controller but by the control system realizing when the air vehicle AV, moves a certain distance away from predefined flight route and allowing a stepwise or gradual switch from an automatic flight with zero operational freedom to an autonomous flight with unrestricted operational freedom.

The level of intervention by the air vehicle control system, i.e. a flight control intervention constraint level, can be preselected, ranging from a minimum intervention level, providing full freedom of movement (until the air vehicle AV does reach a position where unconstrained continuation in the flight direction may become unsafe) to being preprogrammed end to end as if on a shuttle train or a virtual roller-coaster. In this scenario, wherein the air vehicle control system has full control, neither the pilot nor the passengers will require prior piloting skills. The only input that would be required from the humans on-board, would be that of the setting of the destination of the journey.

Ultimately, the air vehicle control system according to the present invention is adapted to calculate probabilities for providing safe recovery at any given time, i.e. emergency or recovery manoeuvres. The air vehicle control system will always intervene if an air vehicle AV does run out of safe flight path options.

This approach forms a complete departure from existing conventional air traffic management systems, which first assume that all airspace is blocked, only then to grant use of a particular flight level, flight route, waypoints or time slots, with very few exceptions, usually for military purposes. In a way, the air vehicle control system according to the present invention forms a subtractive system, starting with full freedom of operation and restricting this on the basis of a combination of different constraints C, while conventional air traffic management systems used for commercial airliners are additive, starting at zero permission.

In a possible embodiment of the air vehicle control system the flight control intervention constraint, fciC, comprises a pre-set or adjustable flight control intervention constraint level, fciC-L, indicating an extent of intervention of the air flight guarding control unit with the flight controls of the air vehicle, AV, wherein the air flight guarding control unit of the air vehicle, AV, is adapted to intervene automatically with the flight controls of the air vehicle, AV, by modifying or overriding flight commands provided by a pilot or by an autopilot of the air vehicle, AV, in real time to change at least one physical operation parameter of the air vehicle, AV, according to the current flight control intervention constraint level, fciC-L, of the flight control intervention constraint, fciC.

In a possible embodiment the modified commands, CMDs', are supplied by the air flight guarding control unit to a flight control computer, FCC, which is adapted to control actuators of the air vehicle, AV, according to the modified flight commands, CMD'.

In a possible embodiment of the air vehicle control system, at least one flight control intervention constraint level, fciC-L, does range from an autonomous level, fciC-Lmin, for minimal intervention adapted to provide a free autonomous flying movement of the air vehicle, AV, from a start position within the spatial confines of the calculated and updated flight route (FR) assigned to the air vehicle, AV, by the vehicle control system to a destination position to an automated level, fciC-Lmax, for maximal intervention adapted to provide a fully automatic predetermined end-to-end flying movement of the air vehicle, AV, from a starting position within the spatial confines of the calculated and updated flight route (FR) assigned to the air vehicle, AV, by the vehicle control system to a destination position.

A fully automated setting of fciC-Lmax allows full control for the air vehicle control system wherein, neither the on-board or remote pilot nor the passengers will require prior piloting skills. The only input that would be required from the humans on-board or on-ground pilots, would be that of the setting of the destination of the flight route.

In a possible embodiment of the air vehicle control system a combination of constraints, C, on which the extent of intervention of the flight guarding control unit integrated in the air vehicle, AV, does depend comprises besides the flight control intervention constraint, fciC, further constraints, C including:

flying space constraints, fspaceC, including real world physical flying space limitations or spatial confines and virtual flying space constraints;

flying time constraints, ftimeC, including travel time slots, TTS;

flight traffic constraints, ftrafficC, in particular flight traffic densities, relative positions of the air vehicle to other air vehicles, AVs, or to other obstacles;

pilot capability constraints, pcapC, in particular a pilot proficiency of an on board pilot or of a remote pilot of the air vehicle, AV;

flight capability constraints, fcapC, of the air vehicle, AV, including predetermined flight capabilities of the air vehicle, AV, or variable flight capabilities of the air vehicle, AV, derived from the monitored flight status of the air vehicle, AV;

external flight constraints, efC, in particular weather conditions along the assigned flight routes (FR), availability of take-off time slots at the starting position and landing time slots at the destination positions, landscape data and/or predefined air traffic rules and/or other external parameters.

In a possible embodiment of the air vehicle control system the at least one constraint, C, comprises a set constraint, Cset, configured or pre-set at the air flight guarding control unit of the air vehicle, AV, or received by the flight guarding control unit of the air vehicle, AV, via a communication unit (COM) from a ground station of the air vehicle control system or from another air vehicle, AV and/or comprises a variable constraint, Cvar, derived from sensor data supplied by sensors of the air vehicle, AV, to the air flight guarding control unit of the air vehicle, AV, and evaluated by a data processing unit or by a trained artificial intelligence module, AIM, of the flight guarding control unit (3) to adapt continuously the variable constraint, Cvar, or received by the flight guarding control unit of the air vehicle, AV, via a communication unit (COM) from a ground station of the air vehicle control system or received from another air vehicle, AV within the controlled airspace.

In a further possible embodiment of the air vehicle control system the flight route plan, FRP, is calculated and updated continuously and/or event driven in response to a flight control intervention request received by a control centre of the air vehicle control system depending on a current flight status of the air vehicles, AVs, on the basis of predefined flight planning criteria, FPC, and/or on the basis of predefined optimization criteria, OC, wherein the flight route plan, FRP, comprises a plurality of flight routes (FR) with associated air tracks, ATs, assigned by the control centre to the different air vehicles, AVs.

In a further possible embodiment of the air vehicle control system the flight routes (FR) assigned by the control centre to the different air vehicles, AVs, are communicated by means of at least one ground station of the air vehicle control system directly or via at least one satellite or other communication node to the air flight guarding control units integrated in the different air vehicles, AVs, wherein the calculated flight route plan, FRP, comprises three-dimensional air tracks (ATs) or four dimensional air tracks (ATs) each comprising one or more virtual air track segments (ATS) each having an interior air lane (AL) surrounded by an associated air strip (AS), wherein each air track segment (ATS) of the air track (AT) belonging to a flight route (FR) assigned to an air vehicle, AV, (2) according to the flight route plan, FRP, comprises a first virtual inner air track boundary (B1) between the interior air lane (AL) and the air strip (AS) surrounding the air lane (AL) and a second virtual outer air track boundary (B2) between the air strip (AS) and the exterior airspace forming the spatial confines of the air track (AT), wherein the virtual air track boundaries (B1,B2) and/or a virtual length of the air track segments (ATS) of the air track (AT) are adjusted dynamically during an update of the calculated flight route plan, FRP.

In a further possible embodiment of the air vehicle control system the air track segments (ATS) of an air track (AT) belonging to a flight route (FR) assigned to an air vehicle, AV, according to the calculated flight route plan, FRP, comprise virtual air track boundaries (B1, B2) and a length (L) calculated dynamically according to a formula or algorithm by a processing unit depending on set constraints, Cset, and/or depending on variable constraints, Cvar.

In a possible embodiment of the air vehicle control system the air track (AT) associated with a flight route (FR) assigned by the control centre to the air vehicle, AV, according to the calculated flight route plan, FRP, is adjusted during a flight movement of the air vehicle, AV, by recalculating and changing dynamically the virtual air track boundaries (B1, B2) and/or length of the air track segments (ATS) of the respective air track (AT).

In a possible embodiment of the air vehicle control system the air flight guarding control unit of the air vehicle, AV, is adapted to predict continuously flight trajectories, T, of the air vehicle, AV, flying along the assigned flight route (FR) within the dynamic three-dimensional spatial confines or virtual air track boundaries (B1,B2) of air track segments (ATS) of the associated air track (AT) based on flight commands, CMDs, input by a pilot of the air vehicle, AV, or generated by an autopilot of the air vehicle, AV, and to intervene with the flight controls of the air vehicle, AV, by modifying or overruling the flight commands if the predicted flight trajectories, T, lead the air vehicle, AV, outside the dynamic three-dimensional spatial confines of the air track (AT) associated with the assigned flight route (FR) of the calculated and updated flight route plan, FRP.

In a possible embodiment of the air vehicle control system the flight route (FR) with its associated air track (AT) is assigned by the control centre of the air vehicle control system in response to a flight route assignment request, FRAQ, received for the air vehicle, AV, pre-flight to the air vehicle, AV, according to the calculated flight route plan, FRP, before take-off of the air vehicle, AV, and adjusted during movement of the air vehicle, AV, within the spatial confines of the air track (AT) belonging to the assigned flight route (FR) according to the current continuously updated flight route plan, FRP, communicated by the control centre of the air vehicle control system to the air vehicle, AV, directly via at least one ground station of the air vehicle control system by means of a wireless communication link (WCL) or communicated indirectly via a satellite communication link or other communication relay node.

In a possible embodiment of the air vehicle control the flight planning criteria, FPC, used by the control centre of the air vehicle control system to calculate and update continuously the flight route plan, FRP, including a plurality of flight routes (FR) with associated air tracks (ATs) assigned to the participating air vehicles, AVs, comprise one or more constraints, C, including:

flying space constraints, fspaceC, of the participating air vehicles, AV, flying time constraints, ftimeC, of the participating air vehicles, AV, flight capability constraints, fcapC, of the participating air vehicles, AVs, pilot capability constraints, pcapC, of pilots of the participating air vehicles, AVs, flight traffic constraints, ftrafficC, in particular flight traffic densities, relative positions of air vehicles (2) to other air vehicles, AVs, or to other obstacles, external flight constraints, efC, in particular weather conditions along the assigned flight routes (FR), availability of take-off time slots at the start position and landing time slots at the destination positions, landscape data and/or predefined air traffic rules and/or other external parameters.

In a possible embodiment of the air vehicle control system the optimization criteria, OC, used by the control centre of the air vehicle control system to calculate, update and optimize continuously the flight route plan, FRP, for an individual AV, or for a specific fleet of air vehicles, AVs, or for the entire airspace controlled by the air vehicle control system comprise environment related optimization criteria, EnvOC, including minimizing emissions and energy consumption of air vehicles, AV, safety related optimization criteria, SaOC, and/or efficiency related optimization criteria, EffOC.

In a possible embodiment of the air vehicle control system the air track (AT) associated with a flight route (FR) of the calculated and updated flight route plan, FRP, and assigned by the air vehicle control system to an air vehicle, AV, forms a four-dimensional air track (AT) consisting of a sequence of virtual air track segments (ATS) connected with each other seamlessly along the air track (AT) belonging to the flight route (FR), wherein the four-dimensional air track (AT) comprises three space dimensions (x,y,z) formed by a three-dimensional airspace corridor or tunnel within spatial confines of the air track segments (ATS) of the four dimensional air track (AT) assigned to the air vehicle, AV, according to the calculated and updated flight route plan, FRP, and a time dimension (t) formed by a sequence of travel time slots, TTS, calculated and assigned dynamically by the air control system to an associated sequence of virtual air track segments (ATS) of said four dimensional air track (AT), wherein the virtual air track segments (ATS) of the four-dimensional air track (AT) are activated sequentially during their associated travel time slots, TTS, along the respective flight route (FR) assigned to the air vehicle, AV, according to the calculated and updated flight route plan, FRP.

In a possible embodiment of the air vehicle control system the monitored flight status of the air vehicle, AV, comprises static physical operation parameters of the air vehicle, AV, including a size and geometry of the air vehicle, AV, a physical weight of the air vehicle, AV, and operation capabilities of the air vehicle, AV, and/or comprises dynamic physical operation parameters of the air vehicle, AV, including a current position, heading, speed, acceleration, barometric height, angle of attack and impulse of the air vehicle, AV, in three spatial dimensions over time and/or comprises logic operation parameters of an air vehicle, AV, including a flight phase status of the air vehicle, AV, during different flight phases of the air vehicle, AV.

In a possible embodiment of the air vehicle control system the air flight guarding control unit of the air vehicle, AV, is adapted to calculate continuously recovery manoeuvres to keep the air vehicle, AV, within the spatial confines of the air track segments (ATS) of the air track (AT) of the assigned flight route (FR) if the flight trajectories, T, predicted by the flight guarding control unit lead the air vehicle, AV, outside the dynamic spatial confines or virtual air track boundaries (B1,B2) of the air track segments (ATS) of the air track (AT)

of the flight route (FR) assigned to the air vehicle, AV, according to the calculated and updated flight route plan, FRP.

In a possible embodiment of the air vehicle control system if a communication of the air flight guarding control unit of the air vehicle, AV, and the ground stations or the satellites or other communication relay nodes of the air vehicle control system is interrupted or if another contingency situation is detected, the flight guarding control unit either stops the intervention with the flight controls of the air vehicle, AV, leaving full control to the pilot or autopilot of the air vehicle, AV, in an autonomous flying movement or calculates automatically an contingency manoeuvre performed by the air vehicle, AV, under the control of the air flight guarding control unit based on sensor data provided by on board sensors of the air vehicle, AV, to overcome the detected contingency situation.

In a possible embodiment of the air vehicle control system the air flight guarding control unit integrated in the air vehicle, AV, is connected to a user interface, UI, adapted to visualize for a pilot, a passenger and/or another interested party the flight route (FR) with the associated air track (AT) assigned to the respective air vehicle, AV, according to the calculated and updated flight route plan, FRP, and/or to visualize other flight routes (FRs) with associated air tracks (ATs) assigned to other air vehicles, AVs, according to the calculated and updated flight route plan, FRP.

In a possible embodiment of the air vehicle control system the air flight guarding control unit, integrated in the air vehicle, AV, is adapted to provide a user or training feedback via a user interface, UI, to an on-board pilot of the air vehicle, AV, or to a remote pilot at a ground station of the air vehicle control system.

In a possible embodiment of the air vehicle control system wherein the user interface, UI, is adapted to blend a real-world flight scenario with a virtual world flight scenario by means of an augmented reality, AR, a virtual reality, VR, user headset placed on a head of a user participating in a video game and/or being schooled by a flight training program.

In a preferred embodiment of the air vehicle control system, the air vehicle control system comprises a common distributed time base or time reference system used to provide travel time slots TTS assigned by the control centre of the air vehicle control system to air track segments (ATSs) of air tracks (ATs) associated with flight routes (FRs) assigned to air vehicles by the control centre according to the current flight route plan FRP to indicate time periods where the respective air track segments (ATS) are occupied by the air vehicles traveling along the air tracks (AT) of the flight routes (FR) assigned to the air vehicles.

The invention provides according to a second aspect a computer implemented method for controlling flight movements of a plurality of different air vehicles, AV, within an available airspace, the method comprising the steps of:

calculating and updating by a control centre of an air vehicle control system a flight route plan, FRP, depending on a current flight status of the air vehicles, AVs, (2) on the basis of predefined flight planning criteria, FPC, and/or on the basis of predefined optimization criteria, OC, wherein the flight route plan, FRP, comprises a plurality of flight routes (FR) with associated air tracks, ATs;

assigning by the control centre of the air vehicle control system flight routes (FRs) to the different air vehicles, AVs, according to the calculated and updated flight route plan, FRP, communicating by the at least one ground station of the air vehicle control system the assigned flight routes (FRs) to air flight guarding control units integrated in the different air vehicles, AVs, and performing by the air flight guarding control units integrated in the air vehicles, AVs, automatically interventions with flight controls of the respective air vehicles, AVs, according to a flight control intervention constraint level, fciC-L, on the basis of the current flight status, MFS, of the air vehicles, AVs, monitored by the integrated flight guarding control units such that each air vehicle, AV, is kept during its flight movement along its assigned flight route (FR) within the dynamic three-dimensional spatial confines or virtual air track boundaries (B) of air track segments (ATS) of an air track(AT) belonging to the respective assigned flight route (FR) to avoid collisions with the other air vehicles, AVs, or with other obstacles in the airspace, wherein the flight control intervention constraint level, fciC-L, comprises a pre-set or adjustable updated flight control intervention constraint level, fciC-L, indicating an extent of intervention of the air flight guarding control unit with the flight controls of the air vehicle, AV.

In a preferred embodiment the assigned air tracks (ATs) are dynamically changed during flight of the air vehicles, AVs, (2), based on variable constraints or variable parameters.

The invention provides according to a further aspect an air vehicle control system for operation of one or more air vehicles flying along a flight route assigned to the air vehicles by said air control system according to a calculated flight route plan within a predefined airspace, wherein an air flight guarding control unit integrated in the air vehicle is adapted to intervene automatically with flight controls of the air vehicle on the basis of a monitored flight status of the air vehicle such that the air vehicle is kept during a flight movement within confines or boundaries of the assigned flight route and loss of separation from other air vehicles or from other obstacles is avoided.

The confines or boundaries of the assigned flight route are in a preferred embodiment spatial three-dimensional and can be changed dynamically according to the precalculated but potentially dynamically changing flight route plan, FRP.

The air vehicle control system according to the first aspect has the advantage that it is fully compatible with the existing conventional air traffic control system. The air vehicle control system according to the present invention makes use of a predefined airspace In a further possible embodiment of the air vehicle control system according to the first aspect of the present invention, the flight route FR with its associated air track AT is assigned by the air vehicle control system in response to a flight route assignment request FRAR received for the respective air vehicle.

The flight route assignment request FRAR can be issued by the flight guarding control unit of the air vehicle AV or by another entity of the system before take-off of the air vehicle AV. During flight the flight guarding control unit of the air vehicle, AV can issue a flight route change request FRCR supplied to the control centre, in particular, in a detected contingency situation or in response to detected conflict situation where a predicted collision with another air vehicle is determined.

In a further possible embodiment of the air vehicle control system according to the first aspect of the present invention, the air track associated with a flight route of the flight route plan FRP forms a four-dimensional air track AT having a three-dimensional airspace corridor within spatial confines of the flight route FR assigned according to the calculated and updated flight route plan FRP to the air vehicle AV for an assigned time dimension formed by a corresponding flight travel time period of the flight route FR.

In a further possible embodiment of the air vehicle control system according to the first aspect of the present invention, the air track AT belonging to a flight route FR assigned to an air vehicle AV according to the flight route plan FRP comprises a first virtual inner air track boundary between the interior air lane and the air strip surrounding the air lane AL and a second virtual outer air track boundary between the air strip AS and the exterior airspace forming the spatial confines of the air track AT.

In a further possible embodiment of the air vehicle control system according to the first aspect of the present invention, each air vehicle is adapted to transport freight or passengers along the assigned flight route inside the spatial confines or virtual boundaries (B) of the air track segments (ATS) of the associated air track (AT) within the assigned total flight time period from a start position to a destination position according to the calculated and continuously updated flight route plan, FRP.

In a further possible embodiment of the air vehicle control system according to the first aspect of the present invention, the flight guarding control unit integrated in the air vehicle is connected to a user interface adapted to visualize for a pilot, passenger and/or other interested party the flight route with the associated air track assigned to the respective air vehicle according to the calculated and updated flight route plan and/or to visualize other flight routes with associated air tracks assigned to other air vehicles according to the calculated and updated flight route plan.

This serves to avoid a startling of the air vehicle passengers in case of sudden air vehicle movements, as information for preparation and planning, and to reduce the risk of motion sickness by linking movement and expectation of movement. In a further possible embodiment, VR headsets, used by pilots and passengers, display information, early warning, avoidance of startling situations, by showing the planned flight route so that the visual and inner ear balance sensory inputs are matched to avoid nausea or to avoid startling the passengers due to surprising changes of course or acceleration.

In a further possible embodiment of the air vehicle control system according to the first aspect of the present invention, the flight guarding control unit integrated in the air vehicle is adapted to provide a training feedback via a user interface to a pilot of the air vehicle placed in the cockpit of the air vehicle or placed at a ground station of the air vehicle control system. It also is able to interfere with the pilot controls to any degree necessary to balance freedom of pilot control and safety of operation. As the flight student proficiency increases, the level of interference decreases, based on pilot certifications and actual capabilities, allowing the system to be a virtual flight school, ultimately issuing pilot certificates. In a further possible embodiment, the artificial intelligence of the control system is able to learn new information with every flight, thereby gradually improving vehicle behaviour and sensitivity to erratic pilot manoeuvres.

In a further possible embodiment of the air vehicle control system according to the first aspect of the present invention, the flight route plan, FRP, comprises an air race flight plan comprising flight routes with associated air tracks assigned within a limited airspace to competing air vehicles participating in an air race event.

In a further possible embodiment, the air vehicle control system is adapted to operate a plurality of heterogeneous air vehicles including piloted or unpiloted airplanes, helicopters and drones.

In a further possible embodiment of the air vehicle control system according to the first aspect of the present invention, the flight routes with the associated air tracks are assigned according to the calculated flight route plan FRP within an available free airspace, in particular a not controlled airspace.

In a possible embodiment, the available free airspace used for the assigned flight routes can comprise a near-ground airspace having for instance a maximum altitude of less than 14.500 feet above ground level.

The invention further provides an air flight guarding control unit integrated in an air vehicle and adapted to intervene automatically with flight controls of the respective air vehicle on the basis of a monitored flight status of the respective air vehicle AV such that the air vehicle is kept during a flight movement within dynamic three-dimensional spatial confines or boundaries of an assigned flight route FR to avoid collisions with other air vehicles AVs or with other obstacles, wherein the flight route FR is assigned within an available airspace to the air vehicle AV according to a flight route plan FRP calculated and updated continuously by a control centre of the air vehicle control system being connected directly or indirectly to the air flight guarding control unit of the air vehicle AV by means of least one ground station via a wireless communication link.

The invention further provides a control centre of an air vehicle control system connected by means of at least one ground station directly or indirectly via wireless communication links to air flight guarding control units integrated in different air vehicles AVs, wherein the control centre comprises a processing unit adapted to calculate and to continuously update a flight route plan FRP for the air vehicles AVs depending on a monitored current monitored flight status, MFS, of the participating air vehicles AVs on the basis of predefined flight planning criteria, FPC, and/or predefined optimization criteria, OC.

In the following, possible embodiments of different aspects of the present invention are described in more detail with reference to the enclosed figures.

Figure 1:
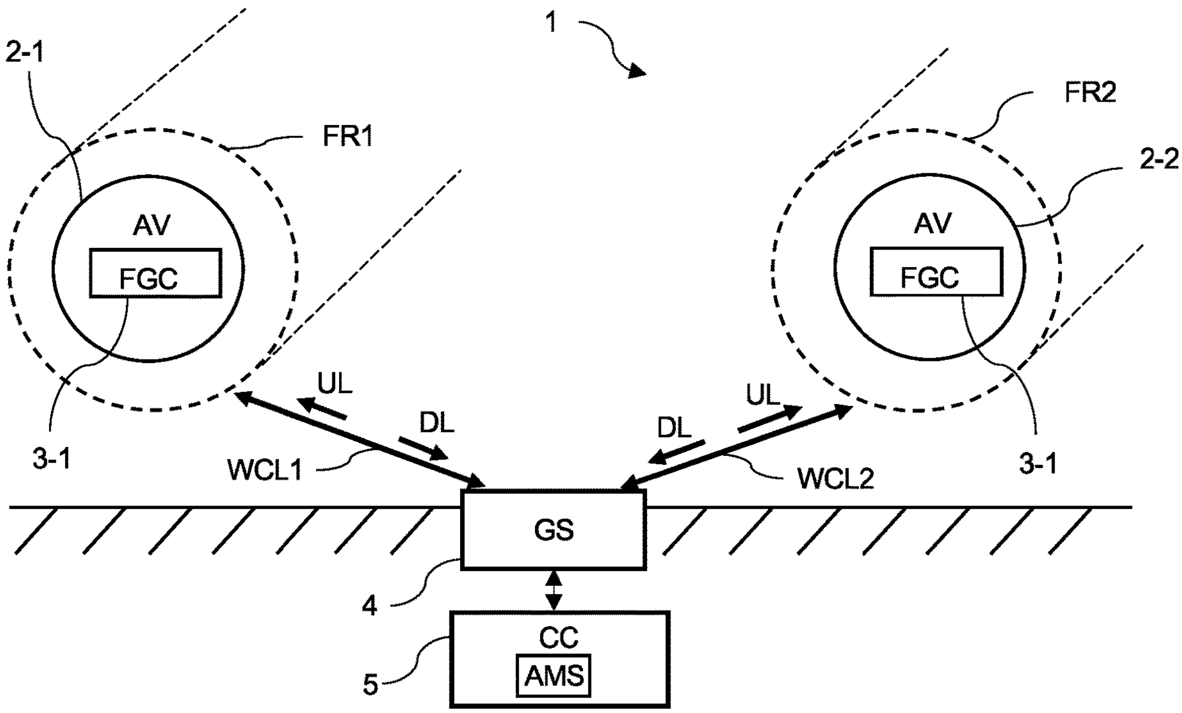
FIG. 1 shows schematically a possible exemplary embodiment of an air vehicle control system according to the first aspect of the present invention.

FIG. 1 shows schematically a possible exemplary embodiment of an air vehicle control system 1 according to the first aspect of the present invention for operation of one or more air vehicles, AV, 2. The air vehicle control system 1 as shown schematically in FIG. 1 can be used to control the movements of a plurality of different air vehicles AVs within an available airspace. An air vehicle 2 can comprise different kinds of air vehicles, in particular airplanes, helicopters or drones. FIG. 1 shows schematically two different air vehicles 2-1, 2-2 flying in an available airspace above ground level. Each air vehicle 2-1, 2-2 comprises an integrated flight guarding control unit 3-1, 3-2 as shown in FIG. 1. The flight guarding control units 3-1, 3-2 can in a possible embodiment communicate with each other by means of a communication module. Further, the flight guarding control units 3-1, 3-2 of the air vehicle 2-1, 2-2 can also communicate with at least one ground station 4 of the air vehicle control system 1 as shown in FIG. 1. The ground station 4 can be connected via a data network to a control centre 5 of the air vehicle control system 1. Several distributed ground stations can be connected via a communication network to the control centre 5 of the air vehicle control system 1. The ground station 4 comprises communication modules provided to establish wireless communication links WCLs with the flight guarding control units 3-1, 3-2 integrated in the air vehicles 2-1, 2-2.

The air vehicle control system 1 is provided for controlling the operation of AVs 2, flying along flight routes (FR) assigned to the air vehicles, AVs, 2 by said air vehicle control system 1 according to a flight route plan, FRP, within a predefined controlled airspace The flight route plan, FRP, can be calculated and updated continuously in real time by the air vehicle control system 1. The air flight guarding control unit 3 integrated in any of the air vehicles, AV, 2 is adapted to intervene automatically with flight controls of the air vehicle, AV, 2 according to at least one constraint, on the basis of a monitored flight status, MFS, of the respective air vehicle, AV, 2 such that the air vehicle, AV, 2 is kept during its flight movement within dynamic three-dimensional spatial confines or virtual air track boundaries (B) of air track segments (ATS) of an air track (AT) belonging to the assigned flight route (FR) to avoid collisions with other air vehicles, AVs, or with other obstacles in the controlled airspace.

The constraint, C, considered by the flight guarding control unit 3 can comprise a flight control intervention constraint, fciC, having a pre-set or adjustable flight control intervention constraint level, fciC-L, indicating an extent of intervention of the air flight guarding control unit 3 with the flight controls of the air vehicle, AV, 2. The air flight guarding control unit 3 of the air vehicle, AV, 2 is adapted to intervene automatically with the flight controls of the air vehicle, AV, 2 by modifying or overriding flight commands CMDs provided by an on board or remote pilot or by an autopilot of the air vehicle, AV, 2 in real time to change at least one physical operation parameter of the air vehicle, AV, 2 according to the current flight control intervention constraint level, fciC-L, of the flight control intervention constraint, fciC. Each discrete flight control intervention constraint level, fciC-L applied to the air flight guarding control unit 3 can trigger a switching of the flight guarding control unit 3 into an associated control operation mode or control routine taking into account different other available constraints, C, processed by a processing unit of the flight guarding control unit 3 to generate modified flight control signals output by the air flight guarding control unit 3 to a connected flight control computer (FCC) 7 which controls different kinds of the actuators 8 of the air vehicle 2 as also shown in the block diagram of FIG. 2

In a possible embodiment of the air vehicle control system 1 as shown in FIG. 1 the at least one flight control intervention constraint level, fciC-L, does range from an autonomous level, fciC-Lmin, for minimal intervention adapted to provide a free autonomous flying movement of the air vehicle, AV, 2 from a start position within the spatial confines of the calculated and updated flight route (FR) assigned to the air vehicle, AV, 2 by the vehicle control system 1 to a destination position to an automated level, fciC-Lmax, for maximal intervention adapted to provide a fully automatic predetermined end-to-end flying movement of the air vehicle, AV, 2 from a start position within the spatial confines of the calculated and updated flight route (FR) assigned to the air vehicle, AV, 2 by the vehicle control system 1 to a destination position and within the time restrictions set by the assigned travel time slots TTSs. The number of flight control intervention constraint levels, fciC-L, of the flight control intervention constraint, fciC and of associated operation modes can vary for different use cases.

In the air vehicle control system 1 according to present invention an intervention with flight controls of an air vehicle 2 is performed by the flight control guarding unit 3 of said air vehicle 2 automatically on the basis of a flight route (FR) with an associated air track (AT) assigned to said air vehicle 2 by the control centre 5 of the air vehicle control system 1 according to a deterministic flight route plan (FRP) calculated and updated by the control centre 5 depending on at least one local or global constraint, C, and depending on the current flight status MFS of the air vehicle AV 2 monitored by the flight guarding control unit 3 such that the air vehicle 2 is kept during its flight travel movement along its assigned flight route (FR) always within the dynamic three-dimensional spatial confines or virtual air track boundaries (B) of air track segments (ATS) of the air track (AT) belonging to the respective assigned flight route (FR) and their associated assigned time travel slots TTSs without any human intervention (fully automatic end to end flying movement) or with some human intervention as defined by the updated level of the flight control intervention constraint, fciC-L, momentary set for the flight guarding control unit 3 of the air vehicle 2.

In a possible embodiment of the air vehicle control system 1 illustrated in FIG. 1 a combination of constraints, C, on which the extent of intervention of the flight guarding control unit 3 integrated in any of the air vehicles, AV, 2-1, 2-2 does depend comprises besides the flight control intervention constraint, fciC, further constraints, C. These further constraints, C, comprise flying space constraints, fspaceC, including real world physical flying space limitations or spatial confines and virtual flying space constraints, flying time constraints, ftimeC, including travel time slots, TTS, flight traffic constraints, ftrafficC, in particular flight traffic densities, relative positions of the air vehicle, AV, 2 to other air vehicles, AVs, or to other obstacles within the controlled airspace, pilot capability constraints, pcapC, in particular a pilot proficiency of an on board pilot or of a remote pilot of the air vehicle, AV, 2, flight capability constraints, fcapC, of the air vehicle, AV, 2 including predetermined flight capabilities of the air vehicle, AV, 2 or variable flight capabilities of the air vehicle, AV, 2 derived from the monitored flight status, MFS, of the air vehicle, AV, 2 and external flight constraints, efC, in particular weather conditions along the assigned flight routes (FR), availability of take-off time slots at the start position and landing time slots at the destination positions, landscape data and/or predefined air traffic rules and/or other external parameters.

In a possible embodiment of the air vehicle control system 1 of FIG. 1 the at least one constraint, C, can comprise a set or pre-set constraint, Cset, configured or pre-set at the air flight guarding control unit 3 of the air vehicle, AV, 2 or received by the flight guarding control unit 3 of the air vehicle, AV, 2 via a communication unit or module(COM) from a ground station 4 of the air vehicle control system 1 or received from another air vehicle, AV, 2. The at least one constraint, C, can also comprise a variable constraint, Cvar, derived from sensor data supplied by sensors of the respective air vehicle, AV, 2 to the air flight guarding control unit 3 of the air vehicle, AV, 2 and evaluated by a data processing unit or by a trained artificial intelligence module, AIM, of the flight guarding control unit 3 to adapt continuously the variable constraint, Cvar, The variable constraint, Cvar, can also be received by the flight guarding control unit 3 of the air vehicle, AV, 2 via a communication unit (COM) from a ground station 4 of the air vehicle control system 1 or received from another air vehicle, AV 2 within the controlled airspace.

In a possible embodiment of the air vehicle control system 1 shown in FIG. 1 the flight route plan, FRP, is calculated and updated continuously and/or event driven by the control centre 5 of the air vehicle control system 1 depending on a current monitored flight status, MFS, of the air vehicles, AVs, 2 on the basis of predefined flight planning criteria, FPC, and/or on the basis of predefined optimization criteria, OC. The flight route plan, FRP, comprises a plurality of flight routes (FR) with associated air tracks, ATs, assigned dynamically in real time by the control centre 5 to the different air vehicles, AVs, 2 within the controlled airspace. In a possible embodiment of the air vehicle control system 1 the flight routes (FR) assigned by the control centre 5 to the different air vehicles, AVs, 2 are communicated by means of the at least one ground station 4 of the air vehicle control system 1 directly or via at least one satellite or other communication node to the air flight guarding control units 3 integrated in the different air vehicles, AVs, 2.

Figure 5:
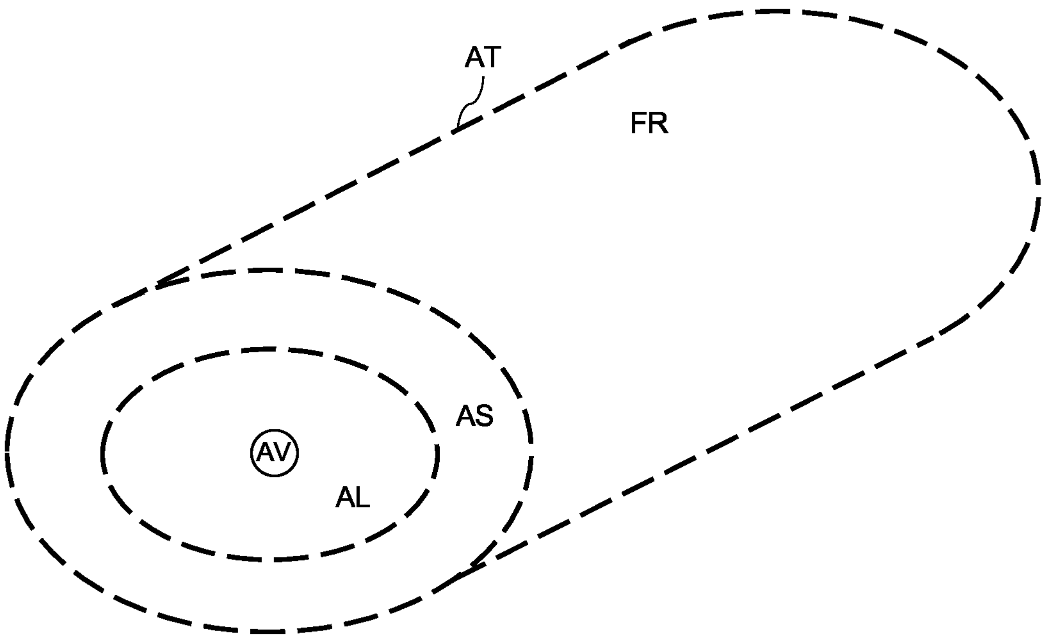
Figure 6:
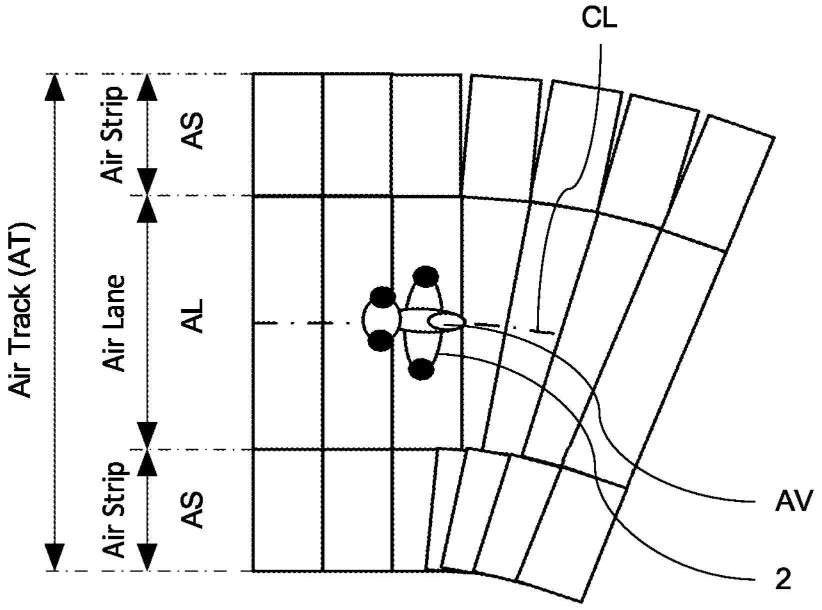
FIGS. 6, 7 show further schematic diagrams for illustrating an embodiment of the air vehicle control system using air tracks to control the flight movement of air vehicles.

The calculated flight route plan, FRP, comprises three-dimensional air tracks (ATs) or in a preferred embodiment four dimensional air tracks (ATs). A four-dimensional air track (AT) comprises one or more virtual air track segments (ATS). Each air track segment (ATS) has an interior air lane (AL) surrounded an all sides by an associated air strip (AS). Each air track segment (ATS) of the air track (AT) belonging to a flight route (FR) assigned to an air vehicle, AV, 2 according to the calculated and updated flight route plan, FRP, can comprise a first virtual inner air track boundary (B1) between the interior air lane (AL) and the air strip (AS) surrounding the air lane (AL) and a second virtual outer air track boundary (B2) between the air strip (AS) and the exterior airspace forming the spatial confines of the air track (AT) as shown in FIGS. 5, 6. The virtual air track boundaries (B1, B2) and/or a virtual length (L) of the air track segments (ATS) of the air track (AT) are adjusted dynamically during an update of the calculated flight route plan, FRP.

In a possible embodiment of the air vehicle control system 1 illustrated in FIG. 1 each air track segment(ATS) of an air track (AT) belonging to a flight route (FR) assigned to an air vehicle, AV, 2 according to the calculated flight route plan, FRP, comprises at least two virtual air track boundaries (B1,B2) and a length (L) calculated dynamically according to a formula or algorithm by a processing unit depending on set constraints, Cset, and/or depending on variable constraints, Cvar. In possible embodiment virtual air track boundaries B and the length L of each air track segment ATS of an air track AT along the assigned flight route FR can be calculated by a processing unit of the central ground station 5 having access to a database or cloud which stores a plurality of data about the system 1, airspace or air vehicles, AV, 2 in particular all sorts of constraints, C, and monitored flight status, MFS, of air vehicles, AV, 2 moving within the controlled airspace.

The calculated spatial confines and or calculated time restrictions of the air track segments ATS of the air track AT can be communicated periodically or event driven in real time by the control centre 5 directly or indirectly to the flight guarding control unit 3 of the respective air vehicle, AV, 2 travelling along the air track AT to perform the necessary interventions into the flight controls according to local constraints, Clocal, at the air vehicle, AV, 2 and/or according to global system constraints, Cglobal, valid for the whole air space controlled by the air vehicle control system 1 and stored in the central database of the system. In a possible implementation the global system constraints, Cglobal, can be a communicated by the control centre 5 to the flight guarding control unit 3 of the air vehicle, AV, 2. The flight guarding control unit 3 can comprise itself an on-board processing unit adapted to calculate locally control signals used to intervene with the flight controls generated in response to commands CMDs input by the pilot via a user interface UI or generated by an autopilot of the air vehicle, AV, 2 depending on local constraints, Clocal, and/or depending on global system constraints, Cglobal, received by the flight guarding control unit 3 from a ground station 4 via a communication interface (COM). The local and global constraints can both comprise constant pre-set or preconfigured constraints, Cset, as well as variable adaptable constraints, Cvar.

In a possible embodiment of the air vehicle control system 1 the air track (AT) associated with a flight route (FR) assigned by the control centre 5 to the air vehicle, AV, according to the calculated flight route plan, FRP, is adjusted during a flight movement of the air vehicle, AV, 2 by recalculating and changing dynamically the virtual air track boundaries (B1,B2) and/or length (L) of the air track segments (ATS) of the respective air track (AT).

In a possible embodiment of the air vehicle control system 1 shown in FIG. 1 the air flight guarding control unit 3 of any of the air vehicles, AV, 2-1, 2-2 is adapted to predict continuously flight trajectories, T, of the respective air vehicle, AV, 2 flying along the assigned flight route (FR) within the dynamic three-dimensional spatial confines or virtual air track boundaries (B1,B2) of air track segments (ATS) of the associated air track (AT) based on flight commands input by a pilot of the air vehicle, AV, 2 or generated by an autopilot of the air vehicle, AV, 2 and to intervene with the flight controls of the air vehicle, AV, 2 by modifying or overruling the flight commands CMDs if the predicted flight trajectories, T, do lead the air vehicle, AV, 2 outside the dynamic three-dimensional spatial confines of the air track (AT) associated with the assigned flight route (FR) of the calculated and updated flight route plan, FRP.

In a possible embodiment of the air vehicle control system 1 shown in FIG. 1 the flight route (FR) with its associated air track (AT) is assigned by the control centre 5 of the air vehicle control system 1 in response to a flight route request, FRQ, received for the air vehicle, AV, preflight to the air vehicle, AV, according to the calculated flight route plan, FRP, before take-off of the air vehicle, AV, and is adjusted during movement of the air vehicle, AV, 2 within the spatial confines of the air track (AT) belonging to the assigned flight route (FR) according to the current continuously updated flight route plan, FRP. This flight route (FR) along with the spatial confines and travel time slots, TTS, being used to activate airtrack segments (ATSs) of the air track AT associated with the flight route (FR) are communicated by the control centre 5 of the air vehicle control system 1 to the air vehicle, AV, 2 directly via at least one ground station 4 of the air vehicle control system 1 by means of a wireless communication link (WCL) or communicated indirectly via a satellite communication link or other communication relay node.

In a possible embodiment of the air vehicle control system 1 shown in FIG. 1 the flight planning criteria, FPC, used by the control centre 5 of the air vehicle control system 1 to calculate and update continuously the flight route plan, FRP, including a plurality of flight routes (FR) with associated air tracks (ATs) assigned to the participating air vehicles, AVs, comprise one or more constraints, C. These constraints, C comprise flying space constraints, fspaceC, of the participating air vehicles, AV, flying time constraints, ftimeC, of the participating air vehicles, AV, 2, flight capability constraints, fcapC, of the participating air vehicles, AVs, 2, pilot capability constraints, pcapC, of pilots of the participating air vehicles, AVs, 2, flight traffic constraints, ftrafficC, in particular flight traffic densities, relative positions of air vehicles, AV, 2 to other air vehicles, AVs, or to other obstacles, external flight constraints, efC, in particular weather conditions along the assigned flight routes (FR), availability of take-off time slots at the start position and landing time slots at the destination positions, landscape data and/or predefined air traffic rules and/or other external parameters.

In a possible embodiment of the air vehicle control system 1 shown in FIG. 1 the optimization criteria, OC, used by the control centre 5 of the air vehicle control system 1 to calculate, update and optimize continuously the flight route plan, FRP, for an individual AV, 2 or for a specific fleet of air vehicles, AVs, 2 or for the entire airspace controlled by the air vehicle control system 1 comprise environmental optimization criteria, EnvOC, including minimizing emissions and energy consumption of air vehicles, AV, safety related optimization criteria, SaOC, and/or efficiency related optimization criteria, EffOC.

In a possible embodiment of the air vehicle control system 1 the air track (AT) associated with a flight route (FR) of the calculated and updated flight route plan, FRP, and assigned by the air vehicle control system 1 to an air vehicle, AV, forms a four-dimensional air track (AT) consisting of a sequence of virtual air track segments (ATS) connected with each other seamlessly along the the air track (AT) belonging to the flight route (FR). The four dimensional air track (AT) comprises three space dimensions (x,y,z) formed by a three-dimensional airspace corridor or tunnel within spatial confines of the air track segments (ATS) of the four dimensional air track (AT) assigned to the air vehicle, AV, according to the calculated and updated flight route plan, FRP, and comprises a time dimension (t) formed by a sequence of travel time slots, TTS, calculated and assigned dynamically by the air vehicle control system 1 to an associated sequence of virtual air track segments (ATS) of said four dimensional air track (AT). The virtual air track segments (ATS) of the four-dimensional air track (AT) are activated sequentially during their associated travel time slots, TTS, along the respective flight route (FR) assigned to the air vehicle, AV, 2 according to the calculated and updated flight route plan, FRP. At one point of time only the air track segment ATS with the current air vehicle position of the air vehicle AV 2 is "live" or active. A "live" air track segment forms a kind of air volume bubble around the current position of the air vehicle, AV, 2. Over time the air vehicle AV2 moves along the assigned flight route FR through the sequentially activated live air track segments ATSs of the air track AT associated with the assigned flight route FR. The currently live air track segments ATSs and the upcoming scheduled air track segments ATSs of the air tracks ATS of all participating air vehicles AVs 2 within the whole controlled airspace or at least within a part of the controlled air space are continuously observed by the system 1 to detect potential conflicts and to resolve these potential conflicts pre-emptively. A potential conflict comprises a situation where two air vehicles, AV, 2-1, 2-2 would have in the near future predicted positions within the same air track segments ATS or within overlapping air track segments ATSs or within close air track segments ATSs at the same travel time slot TTS. In this situation there is a danger of a potential collision between the two air vehicles AV 2-1, 2-2. If a potential conflict is detected the air vehicles, AVs 2-1, 2-2 can be rerouted and/or warned by the control centre 5 of the air vehicle control system 1 to initiate countermeasures.

In a possible embodiment of the air vehicle control system 1 shown in FIG. 1 the monitored flight status, MFS, of the air vehicles, AV, 2-1, 2-2 can comprise static physical operation parameters of the respective air vehicle, AV, 2 including a size and geometry of the air vehicle, AV, 2, a physical weight of the air vehicle, AV, 2 and operation capabilities of the air vehicle, AV, 2. The monitored flight status, MFS, of the respective air vehicle, AV, 2 can also comprise dynamic physical operation parameters of the respective air vehicle, AV, 2 including a current position of the air vehicle, AV, 2 in a predefined common coordinate system, a heading, a speed, an acceleration, a barometric height, an angle of attack and a momentary impulse of the air vehicle, AV, 2 in three spatial dimensions over time. The monitored flight status, MFS, of the respective air vehicle, AV, 2 can further comprises logic operation parameters of an air vehicle, AV, 2 including a flight phase status of the air vehicle, AV, 2 during different flight phases of the air vehicle, AV, 2 such as a take-off flight phase at the on ground start position of the flight route FR or a landing flight phase at the on ground destination position of the flight route FR.

In a possible embodiment of the air vehicle control system 1 shown in FIG. 1 the air flight guarding control unit 3 of each air vehicle, AV, 2-1, 2-2 is adapted to calculate continuously recovery manoeuvres to keep the respective air vehicle, AV, 2 within the spatial confines of the air track segments (ATS) of the air track (AT) of the flight route (FR) assigned to the respective air vehicle, AV, 2-1, 2-2 if the flight trajectories, T, predicted by its flight guarding control unit 3 would lead the respective air vehicle, AV, 2-1, 2-2 outside the dynamic spatial confines or virtual air track boundaries (B1,B2) of the air track segments (ATS) of the air track (AT) of the flight route (FR) assigned to the respective air vehicle, AV, 2 according to the calculated and updated flight route plan, FRP.

In a possible embodiment of the air vehicle control system 1 shown in FIG. 1 if a communication of the air flight guarding control unit 3 of an air vehicle, AV, 2 and the ground stations 4 or the satellites or other communication relay nodes of the air vehicle control system 1 is interrupted or compromised or if another contingency situation is detected, the flight guarding control unit 3 of the affected air vehicle, AV, 2 either stops the intervention with the flight controls of the air vehicle, AV, 2 leaving full control to the pilot or autopilot of the affected air vehicle, AV, 2 in an autonomous flying movement or calculates automatically a suitable contingency manoeuvre such as an emergency landing manoeuvre performed by the air vehicle, AV, 2 under the control of its air flight guarding control unit 3 based on sensor data provided by on board sensors of the air vehicle, AV, 2 and based on locally available constraints, C, to overcome the detected contingency situation.

In a possible embodiment of the air vehicle control system 1 as shown in FIG. 1 the air flight guarding control unit 3 integrated any of the air vehicles, AV, 2 is connected to a human machine interface, HMI, 6 adapted to visualize for a pilot, a passenger and/or another interested party the flight route (FR) with the associated air track (AT) assigned to the respective air vehicle, AV, 2 according to the calculated and updated flight route plan, FRP, and/or to visualize other flight routes (FRs) with associated air tracks (ATs) assigned to other air vehicles, AVs, according to the calculated and updated flight route plan, FRP. In a possible embodiment of the air vehicle control system 1 the air flight guarding control unit 3 integrated in the air vehicle, AV, is adapted to provide a user or training feedback via a user interface, UI, to a on board pilot of the air vehicle, AV, 2 or to a remote pilot at the ground station 4 of the air vehicle control system 1. The the user interface, UI, can be adapted to blend a real-world flight scenario with a virtual world flight scenario by means of an augmented reality, AR, a virtual reality, VR, user headset placed on a head of a user participating in a video game and/or being schooled by a flight training program.

In a possible embodiment of the air vehicle control system 1 the flight control intervention constraint level, fciC-L, applied by the flight control guarding unit 3 integrated in the air vehicle, AV, 2 is derived by a trained artificial intelligence module, AIM, in particular by a trained artificial neural network, ANN, of the control centre 5 based on data received in real time by the control centre 5 via a wireless communication link WCL and a ground station 4 from the air vehicle 2. In a possible embodiment of the air vehicle control system 1 data received from an air vehicle, AV, 2 by the control centre 5 is evaluated by the trained artificial intelligence module, AIM, of the control centre 5 in real time to derive automatically an updated flight control intervention constraint level, fciC-L, returned to the flight guarding control unit 3 of the respective air vehicle, AV, 2 and used by the flight guarding control unit 3 to intervene automatically with flight controls of the respective air vehicle, AV, 2 according to the returned updated flight control intervention constraint level, fciC-L. In a further possible embodiment of the air vehicle control system 1 the data evaluated by the artificial intelligence module, AIM, of the control centre 5 comprises data reflecting the momentary operation behaviour of a pilot of the air vehicle 2, in particular flight control commands, CMDs, input by the pilot via a cockpit user interface of the air vehicle, AV, 2 and image data of the pilot provided by a camera placed in a cockpit of the air vehicle 2.

In a possible embodiment of the air vehicle control system the air vehicles 2 comprise piloted air vehicles and/or unpiloted or air vehicles, in particular piloted or unpiloted drones, air planes, aircrafts or helicopters.

Figure 10:
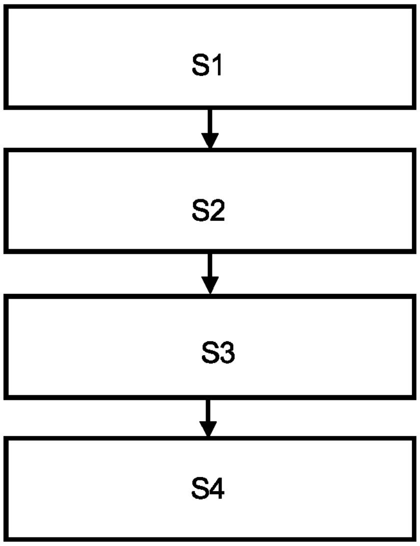
FIG. 10 shows a flowchart for illustrating a possible exemplary embodiment of a computer implemented method for controlling flight movements according to a further aspect of the present invention.

The invention provides according to a second aspect a computer implemented method for controlling flight movements of a plurality of different air vehicles, AV, 2 within an available controlled airspace, as also illustrated in the flow diagram of FIG. 10. The method can comprise the main steps of:

calculating and updating (S1) by a control centre 5 of an air vehicle control system 1 a flight route plan, FRP, depending on a current monitored flight status, MFS; of the air vehicles, AVs, 2 on the basis of predefined flight planning criteria, FPC, and/or on the basis of predefined optimization criteria, OC, wherein the flight route plan, FRP, comprises a plurality of flight routes (FR) with associated air tracks, ATs; assigning (S2) by the control centre 5 of the air vehicle control system 1 flight routes (FRs) to the different air vehicles, AVs, 2 according to the calculated and updated flight route plan, FRP, communicating (S3) by the at least one ground station 4 of the air vehicle control system 1 the assigned flight routes (FRs) to air flight guarding control units 3 integrated in the different air vehicles, AVs, and performing (S4) by the air flight guarding control units 3 integrated in the air vehicles, AVs, automatically interventions with flight controls of the respective air vehicles, AVs, 2 according to at least one constraint, C, in particular according to flight control intervention constraints, fciC, for the different participating air vehicles, AV, 2, on the basis of the current flight status, MFS, of the air vehicles, AVs, monitored in real time by the integrated flight guarding control units 3 such that each air vehicle, AV, is kept during its flight movement along its assigned flight route (FR) within the dynamic three-dimensional spatial confines or virtual air track boundaries (B) of air track segments (ATS) of an air track(AT) belonging to the respective assigned flight route (FR) to avoid collisions with the other air vehicles, AVs, (2) or with other obstacles in the controlled airspace. The flight control intervention constraint, fciC, comprises a pre-set or adjustable flight control intervention constraint level, fciC-L, indicating an extent of intervention of the air flight guarding control unit with the flight controls of the air vehicle, AV. The flight control intervention constraint level, fciC-L, can be set and updated for each participating air vehicle, AV, 2 in real time by the control centre 5 of the air vehicle control or air traffic control system 1.

The air flight guarding control units 3-1, 3-2 integrated in the air vehicles 2-1, 2-2 shown in FIG. 1 are adapted to intervene automatically in step S4 with flight controls of the air vehicles 2-1, 2-2 on the basis of a monitored flight status, MFS, of the respective air vehicle 2 such that both air vehicles 2-1, 2-2 are kept during their flight movement within the confines or boundaries of assigned flight routes FR and collisions with other air vehicles 2 or with other obstacles are avoided. In the illustrated schematic diagram of FIG. 1, the first air vehicle 2-1 is kept during its flight movement within the three-dimensional spatial confines or virtual boundaries B of the assigned flight route FR1. Further, the other vehicle 2-2 is kept during its flight movement within the three-dimensional spatial confines or virtual boundaries B of the other assigned flight route FR2. The first flight guarding control unit 3-1 can communicate with the ground station 4 via a wireless communication link WCL1. The flight guarding control unit 3-2 of the other air vehicle 2-1 can communicate with the ground station 4 with a wireless communication link WCL2. Both communication links WCL1, WCL2 are in a preferred embodiment bidirectional wireless communication links providing an uplink UL and a downlink DL.

Figure 4:
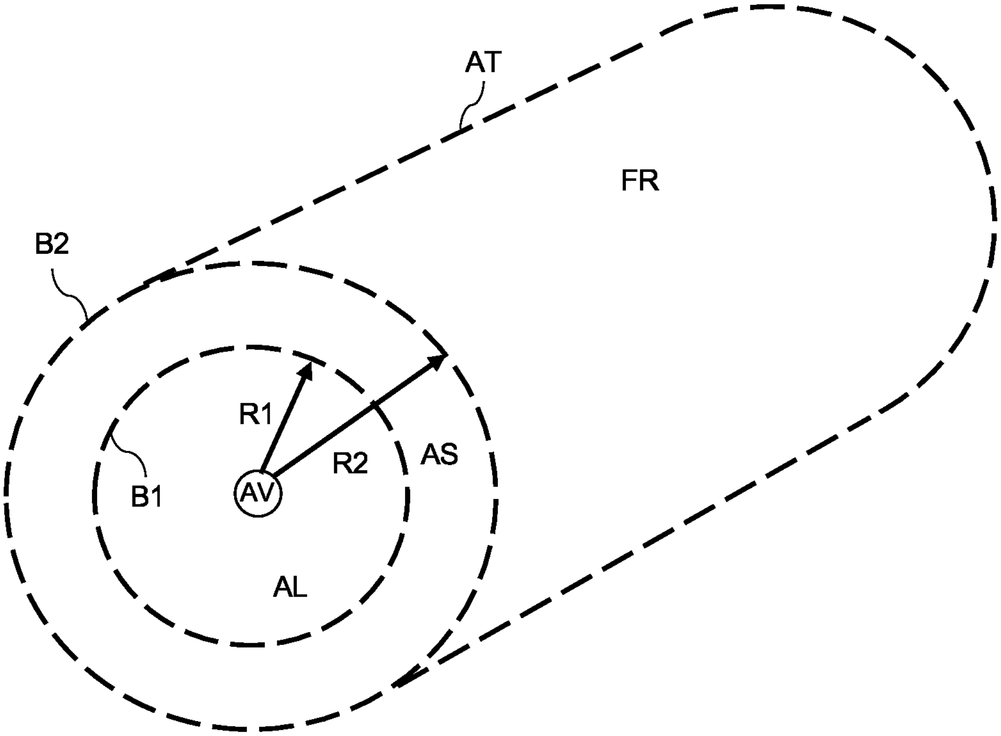
FIGS. 4, 5 show a schematic diagram for illustrating a possible exemplary embodiment of an air vehicle control system using air tracks assigned to flight routes.

In a possible embodiment of the air vehicle control system 1, the flight routes FR assigned to the air vehicles 2 by the air vehicle control system 1 according to a calculated flight route plan FRP comprise three-dimensional air tracks ATs wherein each air track AT comprises an air lane AL and at least one surrounding air strip AS as also shown schematically in FIGS. 4, 5. The flight guarding control unit 3 of the air vehicle 2 is adapted to predict continuously flight trajectories of the air vehicle flying during a flight movement within the three-dimensional confines or boundaries of the assigned flight route FR based on flight commands input by a pilot of the air vehicle 2 or generated by an autopilot of the air vehicle 2 to modify or overrule the flight commands if the predicted flight trajectories lead the air vehicle 2 outside the confines of the assigned flight route FR.

The flight routes FR are assigned to the air vehicles 2 according to a calculated flight route plan FRP. In a preferred embodiment of the air vehicle control system 1, the control centre 5 may include a processing unit adapted to calculate and continuously update a flight route plan FRP. A flight route plan FRP comprise a plurality of flight routes FR with associated air tracks ATs assigned to the participating air vehicles 2-*i*. The flight route plan FRP is calculated and updated continuously by the processing unit of the control centre 5 of the air vehicle control system 1 depending on a current flight status of the participating air vehicles 2.

The flight route plan FRP can be calculated by the processing unit of the control unit 5 on the basis of predefined flight planning criteria FPC and/or on the basis of predefined optimization criteria OC. The flight planning criteria FPC used by the control centre 5 of the air vehicle control system 1 to calculate and update continuously the flight route plan FRP including a plurality of flight routes FR with associated air tracks ATs assigned to the participating air vehicles 2 can comprise in a possible implementation flight capabilities of the air vehicles 2, availability and capabilities of pilots of the air vehicles 2, flight traffic densities, relative positions of the air vehicles 2 to other air vehicles or to other obstacles, external flight conditions, in particular weather conditions, availability of take-off and landing time slots, landscape data, available airspace and predefined air traffic rules. The flight planning criteria FPC can comprise a plurality of different criteria processed according to a sophisticated algorithm executed by the processing unit of the control centre 5.

The control centre 5 of the air vehicle control system 1 can further use optimization criteria OC to calculate, update and optimize continuously the flight route plan FRP. These optimization criteria OC can vary depending on the use case and may include environment related optimization criteria, EnvOC, safety related optimization criteria, SafOC, efficiency related optimization criteria, EffOC, and/or social related optimization criteria. The optimization criteria OC may be used to optimize a fleet of air vehicles 2 present in the available airspace using a variety of influencing parameters. These parameters may include for instance the energy consumption of certain parts or components or environment related optimization criteria such as greenhouse gas emission or noise produced by components or parts of the air vehicles 2. The processing unit of the control centre (5) can continuously optimize the calculated flight route plan FRP using one or more optimization criteria OC depending on the use case.

The flight route FR with its associated air track AT is assigned by the air vehicle control system 1 in a possible embodiment in response to a flight route FR assignment request (FRAR) received for the air vehicle 2. The assignment of the flight route FR can take place pre-flight according to the calculated flight route plan FRP before take-off of the air vehicle (2). After take-off, the flight route FR of the air vehicle 2 can be adjusted continuously during the flight of the air vehicle 2 along the assigned flight route FR according to the continuously updated flight route plan FRP. The readjusted flight route FR can be communicated by the control centre (5) of the air vehicle control system (1) to the flight guarding control unit (3) of the air vehicle (2) by means of at least one ground station (4) of the air vehicle control system (1) via a wireless communication link WCL.

Consequently, the flight routes FR1, FR2 assigned to the air vehicles 2-1, 2-2 in the schematic diagram of FIG. 1 can be continuously readjusted in real time according to the updated flight route plan FRP. The flight routes FR can comprise three-dimensional confines in which the flight movement of the air vehicle 2-*i* takes place. The flight routes FR form three-dimensional flight corridors with differing cross sections. In the illustrated example of FIG. 1, the flight routes FR1, FR2 comprise circular cross sections forming three-dimensional virtual tubes in which the flight movements of the air vehicles 2-*i* take place. The flight guarding control unit 3-*i* integrated in an air vehicle 2-*i* is adapted to intervene automatically with flight controls of the air vehicle 2 on the basis of a monitored flight status of the air vehicle 2 such that the air vehicle 2-*i* is kept during its flight movement within the three-dimensional spatial confines or boundaries of the assigned flight route FR, i.e. within a virtual flight route tube or tunnel.

The monitored flight status, MFS, of the air vehicle 2 can comprise static physical operation parameters, dynamic physical operation parameters or constraint C and logic operation parameters or constraints C of the air vehicle 2.

The static physical operation parameters or constraints C of the air vehicle 2 can include in a possible embodiment a size and geometry of the air vehicle 2, a physical weight of the air vehicle 2 and operation capabilities of the air vehicle 2, in particular acceleration capabilities and/or fuel storage capabilities of the air vehicle 2-*i*.

The dynamic physical operation parameters or constraints C of the air vehicle 2 can include a current position, a heading, a speed or velocity v, an acceleration, a barometric height, an angle of attack and a momentary impulse of the air vehicle 2 in three dimensions. Further, the logic operation parameters or constraints C of the air vehicle 2 can for instance include a flight phase status of the air vehicle 2 during different flight phases of the air vehicle 2. The flight guarding control unit 3 of an air vehicle 2 is adapted in a preferred embodiment to calculate continuously recovery manoeuvres to keep the air vehicle 2-*i* within the spatial confines of the air track AT of the assigned flight route FR if the flight trajectories predicted by the flight guarding control unit 3 may lead the air vehicle 2 outside the confines or boundaries B of the air track AT of the flight route FR assigned to the air vehicle 2 according to the calculated and updated flight route plan FRP. The flight guarding control unit 3-*i* of the air vehicle 2-*i* is adapted to intervene automatically with the flight controls of the air vehicle 2 by modifying or overriding a flight command provided by a pilot or autopilot of the air vehicle 2 in real time to change a physical operation parameter of the air vehicle 2.

In a possible embodiment of the air vehicle control system 1 according to the present invention, the flight routes FR assigned to the air vehicles 2 by the air vehicle control system 1 according to the calculated flight route plan FRP can comprise three-dimensional air tracks ATs as shown in FIGS. 4, 5. Each air track AT comprises an inner air lane AL and a surrounding air strip AS. The form and size of the air tracks ATs can vary depending on the use case. In the illustrated example of FIG. 4, the assigned air track AT comprises a circular cross section, an inner air lane AL surrounded by an air strip AS. The form and size of the air track AT can vary. For instance, in FIG. 5, the air track AT comprises an elliptic cross section and an elliptic air strip AS surrounds an elliptic air lane AL. Other shapes of cross sections may be rectangular, quadratic, triangular or hexagonal depending on the use case. The air track AT assigned to a flight route FR of the flight route plan FRP forms in a possible embodiment a four-dimensional air track AT having a three-dimensional airspace corridor within the confines of the flight route FR being assigned according to the calculated updated flight route plan FRP for an assigned time dimension which may comprise a corresponding flight travel time period reserved for the air vehicle 2 to move within the assigned air track AT from a start position to a destination position.

In a possible embodiment, as also illustrated in the examples of FIGS. 4, 5, an air track AT belonging to a flight route FR can comprise a first virtual inner air track boundary B1 between the interior air lane AL and the air strip AS surrounding the air lane AL, and a second virtual outer air track boundary B2 between the air strip AS and the exterior airspace forming the confines of the air track AT. In the illustrated example of FIG. 4, the air track AT with the circular cross section forming a tube has at its centre a centreline CL forming an ideal flight route path. Around the centre, there is a first virtual inner air track boundary B1 with a radius R1 surrounding the inner air lane AL and a second virtual outer air track boundary B2 between the air strip AS and the exterior airspace forming the external confines of the air track AT. The radius R1 of the second virtual outer air track boundary B2 and the radius R1 of the first virtual inner air track boundary B1 can vary depending on the use case and can also be adjusted dynamically during an update of the flight route plan FRP. Accordingly, the flight route tube illustrated in FIG. 4 can comprise a bigger cross section in an open airspace and a smaller cross section in a restricted airspace. The confines and boundaries of the air track AT associated with the flight route FR can be adjusted dynamically when recalculating the flight route plan FRP.

The air track AT forms a three-dimensional volume having dynamic virtual and invisible borders or confines. The air track AT consists of the air lane AL and the surrounding air strip AS. The air vehicle 2 is usually moving within the air lane AL whereas the air strip AS zone forms a surrounding buffer zone around the air lane AL. In a possible embodiment, the air strip AS is the area zone where the flight guarding control unit 3 intervenes with the regular flight status of the air vehicle 2 and does interfere with the controls to ensure that the air vehicle 2 does not cross the outer air track AT boundary B2. The borders or boundaries of the air track AT are dynamic and can be changed in real time based on outside influences such as weather or traffic control parameters or the approach of another air vehicle within another air track AT that is predicted by calculation to intersect the air vehicle's own air track AT. Depending on the use case, the calculated confines or boundaries B of the flight route FR with its associated air track AT can be constant or variable. In a preferred embodiment, the confines or air track AT boundaries B are flexible and can be varied depending on the current traffic situation.

The air vehicle control system 1 can monitor to what extent any involved air vehicle AV 2 is adhering to an assigned line of travel and is able to adhere to its required position in a potentially dynamically changing air track AT, and does interfere if required according to constraints C. The air track AT consists of the air lane AL, i.e. an area of desired position of the respective AV, and the air strip AS, border zones of the air track AT, where intervention by the air vehicle control system 1 may be necessary to ensure that the AV 2 remains within the confines of the defined air track AT. The air track AT can take the virtual shape of a channel, tunnel, bubble or other geometrically described airspace. The boundaries of the air track AT can be planes with an offset from physical objects such as buildings or the ground, tunnels from start to end point with a predefined cross section, which may be rectangular, circular, or any other shape as required, can be corridors which define starboard or portside limits. It also can be involute shaped by the trajectories T of possible flight paths with a certain amount of time. The air track AT can be left open towards flight directions where no imminent constraints C are apparent, enabling also a completely unconstrained flying experience without the notion of air tracks ATs or flight paths. The air track boundaries or spatial confines can be closer to the body of the air vehicle AV 2 on sides where other AVs with unpredictable flight paths come closer to the air vehicle, AV, 2 always making sure that the air tracks ATs of multiple AVs never intersect each other to stay safe, while the air tracks AT can reach closer to obstacles known to be static such as buildings.

The safety distances of the air vehicle control system 1, in particular the thickness of the air strip AS surrounding the air lane AL may be dynamic, so that an overshooting of the air vehicle AV 2 and breaking out of the air track AT can be avoided at all times, given the prediction of AV dynamics and changes to the air track AT. Influencing parameters which the air vehicle control system 1 considers may be, but are not limited to AV capabilities and current condition and status, pilot capabilities and qualifications, air traffic density, vicinity to other objects and resulting reductions of escape options, weather conditions, emergency situation such as presence of emergency AVs, incapacitation of the pilot as detected by the system AI based on the pilot's behaviour even with confirmed qualification, erratic behaviour, departure from safe airspace, other outside circumstances and other context.

Changes performed to a predefined flight route FR may be geometric in nature, e.g. in the form of a swerve, bypass, larger scale rerouting, change in a flight level and any other forms of collision avoidance of such nature. Changes to a flight route FR may be temporal in nature, e.g. by slowing down one of the parties (i.e. AVs 2) or by accelerating one of the parties, or both, or delaying or preponing the start of one party, or by cancelling one or more of the planned flights.

The boundaries B of the air Track AT and the surrounding air strip AS may be soft, i.e. not geometrically defined. The air vehicle control system 1 can steer an air vehicle AV 2 back to the ideal line of travel, which may be the centreline CL of the air track AT. The amount or extent of steering can be dependent on an observed distance of the AV 2 from an ideal centreline CL of travel, creating for example a sense of gravity towards the centreline CL, or a sense of an invisible rubber band pulling the AV 2 back. The dynamic pulling of the AV 2 back may be felt as linear, increasing, abrupt or in any other way. Situation permitting, the pilot of the air vehicle 2 may choose to fly irrespective of a planned flight route, FPR, if the flight control intervention constraint allows full freedom of movement and if the air vehicle AV 2 remains within the air lane AL and does not reach the inner boundary B1 of the surrounding air strip AS, no interventive control signals triggering corresponding physical forces may be applied as long as the travel situation of the air vehicle AV2 remains safe and its momentary flight path is not influenced. The remaining flight route FR is continuously recalculated, and reported back to the air vehicle control system 1 for comparison with the flight routes FRs and positions of other participating air vehicles AVs 2.

The air track AT constraints C may be other than spatial or temporal in nature, and may include a maximum acceleration, an inclination or rotation of the air vehicle AV 2 to ensure passenger comfort or cargo safety.

The air track boundaries B may be dynamically negotiated in real time in situations where two air tracks ATs may touch, conflict, overlap or intersect with each other in four dimensions, meaning where two AVs 2-1, 2-2 and other objects or obstacles may come into too close a spatial vicinity of each other to ensure avoidance of a collision. Then the air track boundaries B can also be defined by a negotiation, mediation, or optimization process between involved parties. The parties can comprise multiple air vehicles AVs or air space owners (such as non-fly-zone enforcers) or even inhabitants (such as buildings). This negotiation of air tracks ATs and air track boundaries B can be performed by an algorithm based on calculations considering physical facts and situations, predefined air traffic rules, as well as predefined flight rights, possibly based on commercial arrangements and physical or other capabilities of the respective parties.

A negotiation can take higher level parameters into consideration, such as global constraints, Cglobal, or overall system optimization criteria OC beyond the two or more objects involved in this particular air track situation. These optimizations can become part of the negotiation of air track boundaries, and may, though sometimes abstract in nature, be considered additional parties or constraints C to the negotiation. Such additional constraints C may for example be, but not limited to the following: an input request to optimize energy consumption of certain parts (e.g. in case of low battery) of the air vehicle AV 2 or of the overall system; noise minimization in certain areas or times of day or night; weather patterns requiring bigger spacing between air vehicles and other objects due to gusty conditions or low visibility, or a shut-down of the entire system; emergency situations of the overall system or particular areas, such as the passing of an emergency vehicle, giving this vehicle priority of travel; consideration of priorities and tiers of access, whether for legal (e.g. police priority), political (e.g. VIP transport), commercial (e.g. priority air lanes paid for with a fee, technical (e.g. low manoeuvrability) or social (e.g. quiet zones around hospitals, or a smooth ride in case of an ambulance transporting a patient) reasons.

Particular constraints C used during such a negotiation can relate to the enforcement of air traffic rules that resemble the equivalent of street traffic rules including but not limited to rights of way, bans and suspension rules, speed limits, traffic advisories, resolution protocols, rule overrides by entitles parties, rules for emergency situations or emergency AVs. These air traffic rules can be derived from negotiations with incumbent and other parties according to air space rule definitions.

Boundaries B and constraints C, the air track, AT, air track segments ATS, air strip AS and air lane AL or other safety distances, invisible geometrically or otherwise defined walls, may be made visible to the pilot, passenger and other interested parties in augmented reality AR or virtual reality VR headsets, head-up displays, mobile or fixed computer screens and projections inside or outside the air vehicle AV 2 or on the ground for various purposes that may include but are not limited to information, early warning, avoidance of startling situations, anti-nausea by showing the planned flight route FR so that the visual and inner ear balance sensory inputs can be matched to avoid e.g. travel sickness of passengers or to avoid startling the passengers transported by the air vehicle AV 2 due to surprising changes of a travel course or flight direction or due to a surprising acceleration of the air vehicle AV 2.

The air track AT can be defined initially, calculated dynamically and potentially altered once, many times or continuously over the course of a flight, from a multitude of observed parameters or constraints C. At least some of these parameters or constraints C can be external to the air vehicle AV 2 and the air track AT of the assigned flight route FR and can depend on external circumstances including environmental conditions and the current air traffic situation in the controlled air space.

Some of these parameters or constraints C can be internal or intrinsic to, or embedded in the air vehicle AV2, pilot and passengers of the air vehicle AV 2, for example requiring the immediate change of flight trajectory T in the controlled available air space due to a detected technical failure, a detected risk of accidents, unsafe flight envelopes such as stalls due to overshooting maximum angles of attack or a minimum safe speed.

A blend of internal and external parameters or constraints C can be used to define or calculate air tracks ATs as an optimization of all available relevant parameters. The air track AT belonging to the flight route FR can be planned automatically by a processing unit of the air vehicle control system 1 pre-flight in four dimensions, i.e. spatially and including a travel time for the entire flight route FR or for relevant portions or sections thereof, taking into account the following, but not limited to: planning of take-off and landing time slots availabilities including the physical availability of travel time slots TTSs or the availability of temporally required spacing for take-offs and landings between time slots, a monitored or observed air traffic density, observed weather conditions, detected emergency situations and prioritization of air vehicles AV 2 in the available air space. The air vehicle control system 1 allows the prediction of air track changes of air tracks ATs based on outside parameters or constraints C, including but not limited to observed weather patterns. The air vehicle control system 1 can track a monitored flight status MFS of all participating AVs 2 and their air tracks ATs in order to assign additional air tracks ATs.

Changes of an air track AT can be influenced by factors internal and external to the respective air vehicle AV 2 and the respective air track AT. These factors include but are not limited to a conflict resolution and a calculation of appropriate adjustments in case of unsafe flight situations such as loss of separation and unsafe proximity to other AVs, to obstacles or to the ground as defined by the air vehicle control system 1 autonomously based on algorithms, or entitled entities, ensuring an airspace segregated into uncompromised air tracks ATs.

Overriding of current air traffic rules can take place in case of changed rules, emergencies, a shift in priority for a variety of reasons such as priority air traffic. Changes may appear in the continuous monitoring of the controlled airspace, e.g. change of positions of what were assumed to be stationary objects. There can also be changes for airspace optimization criteria OC such as introduced noise reduction levels at night. Changes may also be due to law enforcement rules and other advisories, the protection of sensitive areas such as military or political installations, priorities such as law enforcement rules or emergency vehicles.

A negotiation compromise required for optimal changes can be achieved with a simple calculation of internal parameters but can range all the way to requiring an iteration loop that requires a blend of internal and external parameters or constraints C to be used, even so far as they influence each other in a loop and need to be iterated until an optimal or at least acceptable compromise is found. For example, an unforeseen manoeuvre performed by a first air vehicle AV 2-1 may result to an imminent infringement on the air track spatial confines or boundaries B of another second air vehicle AV 2-2, requiring an escape manoeuvre of the second air vehicle AV 2-2. If, however, this escape manoeuvre cannot be executed safely by the second air vehicle AV 2-2 this triggers that this information or a warning is sent directly or at least indirectly back to the first air vehicle AV 2-1 requesting it to perform an escape manoeuvre itself. A negotiation is performed until an escape or recovery manoeuvre for one or both AVs 2-1, 2-2 can be found that is safe for both air vehicles AVs 2-1, 2-2 and also for other participating air vehicles AVs 2.

The air vehicle control system 1 can be adapted to manage any interaction of multiple air tracks ATs on a system-wide or global level and/or on a local level for an individual conflict between two or more air vehicles AVs 2. The air vehicle control system 1 can perform an overall airspace management, such as airspace capacity planning including global air traffic rules in particular a wider spacing and separation due to bad weather conditions. The air vehicle control system 1 can track and monitor an availability for all volumes, continuously surveying the airspace, providing awareness of all relevant AVs 2 and obstacles, updating available and non-available sections, identifying stationary and moving, permanent and temporary objects, as well as all air traffic and flying objects in the controlled air space.

The air vehicle control system 1 receives flight requests, assigns flight routes FR, take-off and landing time slots, assigns flight permissions and can change a flight status accordingly. The air vehicle control system 1 can use data to calculate 4D trajectories T thus defining and providing air tracks ATs to customers for an assigned time such that a sufficient spatial or time separation between air vehicles AVs 2 and other objects or obstacles is ensured at any given time. The air vehicle control system 1 can be used to negotiate air tracks ATs between involved parties. The air vehicle control system 1 can process surveillance data as well as AV generated data to continuously update the air traffic situation in terms of overall AV density as well as on a detail level to ensure a separation between two AVs 2, with the purpose of issuing advisories or messages to one, multiple or all AVs 2, or with the purpose of actively intervening in current and future flights of one, multiple or all AVs 2 as necessary, e.g. in case of inclement weather or emergencies.

The levels of interference or intervention may be tiered, from simple swerving manoeuvres, to slowing down or pausing AVs 2 in flight, to enforcing an immediate safe landing of all AVs 2 in a section of the controlled air space.

The air vehicle control system 1 can optimize movement for an entire fleet of air vehicles AVs 2 present in the entire controlled airspace or parts thereof by a variety of parameters across the entire managed airspace or parts thereof according to parameters and constraints C that include but are not limited to energy consumption of certain parts (e.g. in case of low battery) or the overall system, optimized energy use or $CO_2$ and other greenhouse gas emission of certain parts or the overall system, noise minimization in certain areas or times of day or night, weather patterns requiring bigger spacing due to gusty conditions or low visibility, emergency shut-down or implementation of constraints C such as lower top speed in parts (e.g. corridors) or the entire system, temporarily, intermittently or continuously, e.g. during passing of an emergency vehicle, at night or in the vicinity of hospitals, consideration of priorities and tiers of access for revenue optimization or incentivization purposes, e.g. use of high speed priority lanes for a fee and special vehicle optimization, e.g. for heavy and low maneuverability vehicles, ambulances, high comfort vehicles.

The system functionality is made possible by an architecture of hardware and software components distributed across AVs 2 and across distributed ground stations 4 and the control centre 5, whether these are on the ground, in a digital cloud or otherwise distributed. Specifically, the air vehicle control system 1 can comprise on-board calculation modules, on-board sensors, communication modules COM on board of each AV 2 as well as on the ground, and calculation modules on the ground including storage or with access to a cloud storage or database.

The modules of the flight guarding control unit 3 are integrated in AVs 2 adapted to calculate required features and functions with or without concurrent communication with other entities. The on-board AV modules may use a set of rules which allow them to act autonomously to a certain extent, e.g. for evading contact to another AV 2 using sensors built into the AV 2. If the required rule set or constraints C are not available or cannot be calculated on board, a communication with the ground station 4 or other entities is required. This is especially the case if a situation may require the AV 2 to leave its assigned air track AT. The onboard system of an air vehicle AV 2 may decide on the level of gravity of a deviation from the expected input based on a situation escalation protocol. It can then decide to either ignore the deviating input and continue on the planned flight path or to calculate a minor response such as a swerve straight in the AV 2 by means of on-board edge computing module, especially if this manoeuvre can be conducted fully within the current air track AT or to communicate with neighbouring AVs 2 to solicit the parameters necessary for calculating the right response or to use other AVs 2 as repeater modules to a ground station 4, and/or to communicate with the ground station 4 directly to solicit the transmission of necessary data to calculate a manoeuvre, especially if this manoeuvre needs to be conducted leaving the current air track AT or to bring the AV 2 to the ground in a safe manoeuvre.

The hardware comprises computer modules or processors which are at least mounted in each participating AV 2 or mounted in ground stations 4 or mounted in the control centre 5. Modules can be added to ensure comprehensive communication and computation coverage. The computation modules are connected by communication modules COM which can operate the predefined frequency bands such as 5G bands and/or using different transmission energy levels and encryption technologies. These modules can communicate with laser-based systems, or microwave-based systems or any combination of these. The communication signals can be transmitted via stationary or moving flying repeater stations, mounted on satellites, drones, balloons, blimps or other aircraft, including other AVs 2 utilizing the air vehicle control system 1 that are connected into a mesh network, communicate with each other or through each other with the ground an including airborne communication stations.

The computation modules of the air vehicle control system 1 can have access to the on-board or retrofitted sensors which include but are not limited to sensors adapted to measure a fuel and/or battery level, pilot conditions, personal settings of pilots and passengers, and other sensors such as acceleration and inclination sensors, orientation and location sensors in particular GPS or magnetic positioning sensors. The computation modules can have access to pre-programmed and firmware parameters including but not limited to AV mass and a flight envelope (if free of damage), battery or fuel tank capacity, power and acceleration, manoeuvrability, other operating parameters or constraint C as well access to a type, model, name, features, license number, payload of the respective air vehicle AV2. The computer modules are able to calculate additional parameters or constraints C from firmware, sensor and calculation outputs. Examples for calculated or derived constraints C include but are not limited to a remaining flight range calculated from battery levels and weather or wind conditions, a maximum acceleration calculated from a pilot weight and additional transported payload. These may be in turn be calculated or derived from a vehicle acceleration measured during the first meters of a flight or from other technical limitations or detected defects that may be relevant for the current flight or from maintenance records. The on-board computer modules can have access to information transmitted to them by the air vehicle control system 1 via the ground stations 4, e.g. a name, an identity, permissions and proficiency level of the pilot and or of the passengers, or other information such as upcoming weather conditions such as gusts and turbulences.

The air vehicle control system 1 enables a required data transfer through suitable communication logic, protocols and commands. Positions, identities and capabilities of AVs 2 in close proximity can be communicated directly between AVs2. Any information or data that is relevant for the AV 2 and its flight path is communicated bidirectionally between the AVs 2 via the ground station 4 and the control centre 5 and can possibly also be supplied to neighbouring AVs 2. The AV-generated information that affects the shape and changes to the respective air track AT is communicated to the control centre 5 located on ground. Overall airspace planning information, global air track shapes and distribution information may remain within one ground station 4 or a network of ground stations 4 or in the database of the control centre 5.

Relevant physics of flight information is communicated including but not limited to absolute position and speed, acceleration, flight vector, trajectory, adherence to Air Track AT and Air Lane AL, relative position and speed, AV type, capabilities and conditions. Non-flight physics related information or data can be communicated with suitable protocols, such as flight routing and intent, identities and documentations, permissions and restrictions, billing, taxation and insurance information, establishment and handover or handshakes, e.g. pre, during and post flight, exchanging relevant information such as identities or cargo slips. Voice and video communication between AVs 2 and/or with the ground station 4 can be enabled or disabled by the air vehicle control system 1. The assignment of responsibilities and accountabilities can be clearly defined in the air vehicle control system 1 between the players such as the pilot, the system taking the role of the flight controller in the tower, and other parties such as the airspace provider, e.g. a municipality. The communication interface and protocols can be designed as an open platform where the rules are published and all relevant parties such as AV manufacturers are able to provide suitable interfaces and inputs. The air vehicle control system 1 adheres with required safety, privacy and cyber security regulations The air vehicle control system 1 can analyse recorded historical data for further optimization and for statistical and predictive and prescriptive purposes, e.g. performing capacity planning and prediction, utilizing but not limited to the following inputs: flight profiles, meteorological data, airspace envelope and structure such as most frequent flight paths communications, routing calculations, charging models or fee levels.

The air vehicle control system 1 allows exercise of a variety of business models and pricing structures to generate commercial value or to fulfil other purposes from its operation including but not limited to the following options. These use cases include but are not limited to a use of the air vehicle control system 1 to manage air traffic in specified limited spaces such as but not limited to the airspace above a city, municipality, region, state, or country, charging for all associated services, products, licenses, features and functions as described.

The air vehicle control system 1 can also be used in conjunction with existing or new physical air race events, enabling the flight of multiple air vehicles concurrently, which was not possible to date due to the risk of collision, and charging the race organizers for the services or products or licenses provided.

The use of the air vehicle control system 1 can be blended with digital gaming applications, where a blending is introduced from purely virtual gaming, including networked and multiplayer optionality, to a fully real-world based flying with the safety net of the system 1. The incremental steps in this range may be, but are not limited to a setup where the video game operator is remote controlling a physical AV with or without passengers through a virtual or physical parcours or race, a setup where the AV pilot is physically flying, but where the pilot's inputs get translated into a video game. A user experience can be enhanced by the use of virtual reality VR or augmented reality AR headsets, head-up displays projections or other means of displaying a virtual world.

The air vehicle control system 1 can also be used for teaching and training purposes such as but not limited to use in a flight school, where the system constraints C are gradually lifted based on the increasing student pilot proficiency, providing an embedded experience far superior to a conventional flight simulator for training. The candidates for the flight school can be selected from the best participants, e.g. with the highest scores, from a selecting video game such as the game described above. Video gaming can be used for dry run flying lessons, replacing conventional flight simulator lessons. Real world/physical flights can be used as incentives and awards for winning users of virtual video games, including but not limited to flying and dog chase games. The air vehicle control system 1 can be programmed such that a particular model with all its characteristics can be simulated, for example including the use of virtual reality VR headsets that provide the matching visuals. The air vehicle control system 1, with or without VR headsets, can simulate speeds, accelerations and motions which the actual AV 2 is not capable of by means of creating inclinations and movements similar to a ground-based flight or driving simulator.

Revenue models include but are not limited to sales, leasing or rental of hardware and software components of the air vehicle control system 1, consulting and contracting services for definition, design, setup, testing and maintenance services, license fees for system use, overall, one-off or multiple, per time, volume, distance, incident, temporally and spatially constrained or unconstrained, for users or owners or leasing agents of one or multiple AVs and complete AV fleets, for operating entities such as municipalities, states or federations, billing, charging and fulfilment services for parts or all services, including but not limited to micro billing down to single actions. The air vehicle control system 1 provides the ability to air pool, i.e. to pick up and drop off passengers at different locations for the sharing of resources and costs in an optimized flight routing management application. The system 1 enable to use a combination of different modes of transport, e.g., the car transport to a pick-up point etc.

The air vehicle control system 1 provides air traffic management and enforcement, actual or in collaboration, a facilitation, an enablement or a provision for processing customer requests for routings, free or charged, permissions management, providing access rights, enforcement of rules and regulations, traffic management, provision and enablement of emergency and priority settings and procedures, reporting management to authorities for identities, flight routes, speeds, accelerations and behaviours, permissions and violations, additional charges or shares thereof, such as usage fees, per single or multiple use, per time period, per region for different types or categories of air tracks ATs, such as access to certain areas, speeds, routings, e.g. shortest, least congested, fastest, most desired or most scenic route, access to restricted areas, e.g. for noise and privacy reasons, or take-off and landing access, use of additional services before take-off or after landing, e.g. local transport access, charging facilities.

The air vehicle control system 1 can also assign priorities and right of way, e.g. preferential flight paths or high speed corridors, fast lanes, scenic routes. The air vehicle control system 1 can initiate single actions such as passing of other AVs, change of lanes, change of path, penalty manoeuvres, supported by micro billing of minute amounts. The air vehicle control system 1 can perform optimization of routing or rerouting for particular situations, e.g. guaranteed arrival by a certain time with all necessary actions or for a detected potential conflict situation. For the purpose of customer incentivization, e.g. scenic routes as a bonus, or waiving or reducing a fee for use of high speed or low congestion priority corridors can be requested. The air vehicle control system 1 allows further usage of analysed historical data for statistical and predictive purposes, e.g. performing capacity planning and prediction.

Figure 7:
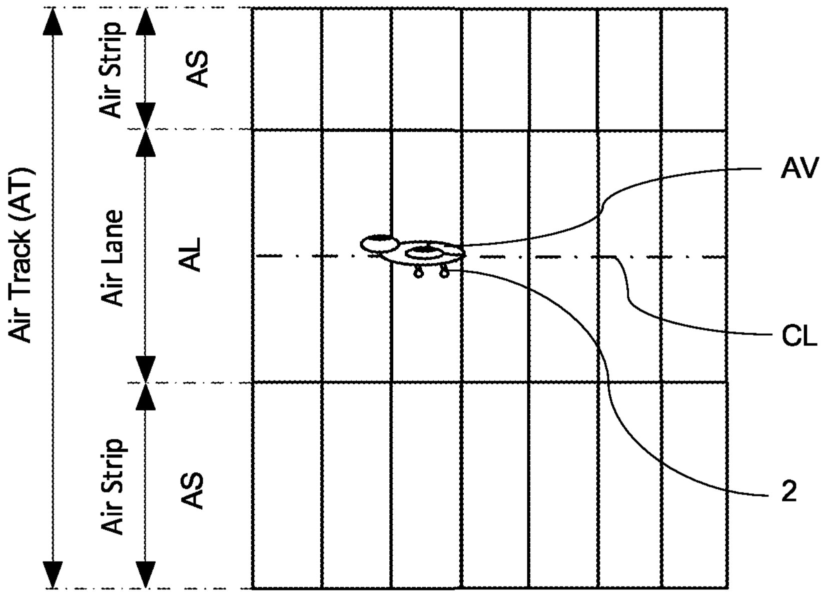

FIGS. 6, 7 illustrate an example of an air track AT wherein an air vehicle 2 is flying along a centreline CL within the air lane AL of the air track AT. In the illustrated example, the air vehicle 2 can be seen from above whereas FIG. 7 shows a side view on the air vehicle 2. As can be seen from FIGS. 6, 7, the air strip AS surrounds the air lane AL having at its centre the centreline CL of the air track AT. The form and size of the air side strip AS can be determined during planning under considerations of the flight performance, navigation performance and safety margins. An air management system AMS of the control centre 5 can ensure that two air tracks ATs do not intersect. The flight guarding control unit 3 integrated in the air vehicle 2 ensures that the respective air vehicle 2 never leaves the assigned air track AT of the flight route FR during flight. A kind of virtual geofencing is performed keeping the air vehicle 2 within the air lane AL of the flight route FR. The air lane AL is a predefined three-dimensional corridor which may be defined by waypoints with latitude, longitude, altitude and horizontal and vertical dimensions forming a highway in the sky. The air side strip AS forms a horizontal and vertical protection limit around the air lane AL at each waypoint. The horizontal and vertical dimensions of the air strip AS may or may not be symmetrical. The main task of the flight guarding control unit 3 is to ensure that the air vehicle 2 stays inside the assigned air track AT at all times.

In an alternative embodiment of the air vehicle control system 1 according to the first aspect of the present invention, the air track AT belonging to a flight route FR assigned to an air vehicle 2 according to the calculated flight route plan FRP can comprise air track AT boundaries B which are calculated dynamically according to a formula or algorithm by a processing unit depending on influencing parameters and constraints C. These influencing parameters or constraints C may comprise capabilities of the air vehicle 2, capabilities of a pilot of the air vehicle 2, a current flight traffic density, a relative position of the air vehicle 2 to other air vehicles or to other obstacles, external flight conditions, in particular weather conditions, landscape data, and predefined air traffic rules. Accordingly, the boundaries B of the air track AT and of the air strip AS can be soft, i.e. not geometrically predefined. The air vehicle control system 1 steers the air vehicle 2 continuously back to an ideal line of travel, i.e. to the centreline CL of the air track AT. The amount of steering can be dependent for example on the distance of the air vehicle 2 from the ideal centreline CL of travel such creating a sense of gravity towards the centreline CL. In this implementation, an invisible rubber band can pull back the air vehicle 2 to the centreline CL of the air lane AL. The dynamic pulling of the air vehicle 2 back to the centreline CL can be dealt as linear, increasing or abrupt or in other ways depending on the use case.

The air strip AS forms a border zone or a buffer zone of the air lane AL where intervention by the air vehicle control system 1 is necessary to ensure that the air vehicle 2 remains within the confines of the defined air track AT. The air track AT can take the virtual shape of a tunnel or any other geometrically described airspace. The boundaries B of the air track AT can form planes with an offset from physical objects or obstacles, in particular buildings built on the ground. The air tracks ATs can form tunnels with a predefined cross section. The cross section of the air track AT can be rectangular, circular or can comprise any other shape as required by the use case. The safety distances provided by the system 1, in particular the extension of the air strip AS surrounding the air lane AL, can be dynamic so that an overshooting of the air vehicle 2 and a breaking out of the air vehicle 2 out of the air track AT can be avoided at all times using the predictions of the air vehicle 2 dynamics and changes of the air track AT. Influencing parameters which are considered by the air vehicle control system 1 can be for instance air vehicle capabilities as well as the current condition status, pilot capabilities and qualifications, current traffic density, the vicinity to other objects or obstacles resulting in a reduction of escape options, weather conditions or any other external circumstances having an influence on the air vehicle dynamics.

The assigned flight route FR with an associated air track AT can be reassigned or changed. The change of a predefined flight route FR can be geometric in nature, e.g., in the form of a bypass, larger scale rerouting, change in flight level or any other forms to provide collision avoidance. The changes of the flight route FR with its associated air track AT can also be temporal in nature, e.g. by slowing down one of the air vehicles 2 or accelerating other air vehicles 2 or performing both. Further, the start of an air vehicle 2 can be delayed to perform a temporal change of the four-dimensional flight route FR comprising three space dimension and a time dimension.

In a possible embodiment, the air track AT boundaries B of an air track AT can also be dynamically negotiated in a traffic situation where two air tracks AT may touch, conflict, overlap or intersect with each other in four dimensions. If two air vehicles 2 or other objects may come too close a renegotiation of the air track AT boundaries of air tracks AT can be performed to ensure avoidance of a collision. Air track AT boundaries can also be defined by a negotiation, mediation or optimization process between the involved parties. These parties can be for instance owners of different air vehicles 2 or different segments of the airspace. The negotiation of the air tracks ATs associated with the assigned flight routes FR can include an algorithm performing a calculation taking into account physical facts and situations, predefined traffic routes as well as predefined rights and physical and other capabilities of the respective air vehicles 2 or parties. The negotiation of the air track AT boundaries and/or air tracks ATs can also take into account higher level parameters such as the overall system optimization beyond the two or more objects involved in the particular air track AT definition. For instance, an energy consumption of air vehicles 2 can be performed or a generated noise can be minimized in certain areas for predefined time periods. Other patterns may require a bigger spacing due to gusty conditions or low visibility. The weather patterns for weather conditions can also require a shutdown of the entire air vehicle control system 1 in certain areas. Other influencing parameters requiring a renegotiation of flight routes FR with associated air tracks ATs include emergency situations of the overall system or in particular areas such as the necessity of letting pass an emergency air vehicle. In this emergency situation, the emergency air vehicle may receive higher priority for traveling so that the air track AT assigned to the emergency air vehicle 2 can follow a strict flight route FR whereas other air vehicles 2 follow a flight route FR around the air track AT of the emergency air vehicle. Such a high priority air vehicle can for instance comprise a police air vehicle or an air vehicle 2 transporting medical staff. Reasons for assigning priority to air vehicles 2 can be social (i.e. VIP transport), commercial, e.g. priority lanes paid for with a fee, technical (e.g. degree of manoeuvreability) or other (e.g. quiet zones around hospitals or a smooth ride in case of an ambulance transporting vehicle for transporting a patient to a destination such as a hospital). The negotiations and/or recalculations of the flight route plan FRP can take into account the enforcement of predefined traffic rules.

Figure 2:
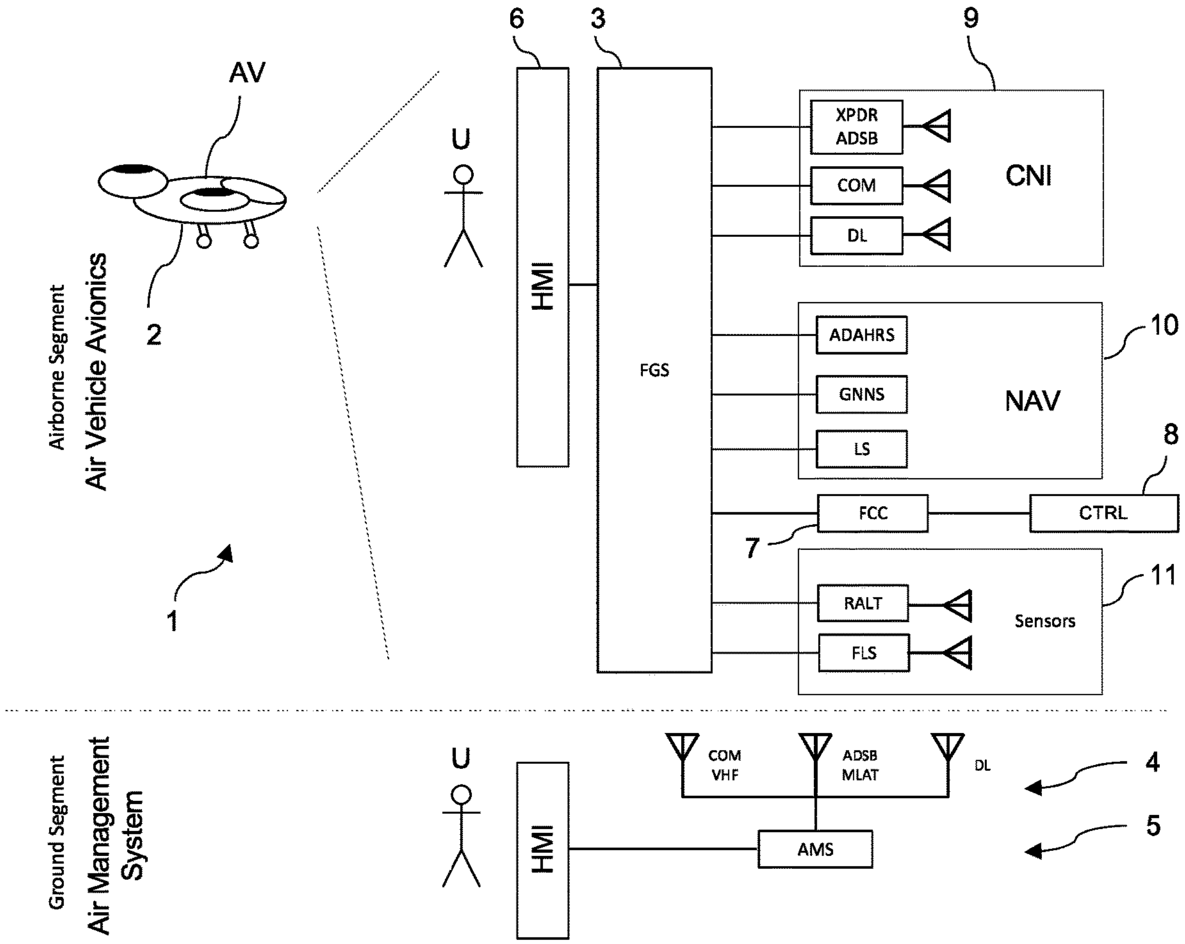
FIG. 2 shows a block diagram of a possible exemplary implementation of an air vehicle control system according to the first aspect of the present invention.

FIG. 2 shows a block diagram of a possible exemplary embodiment of an air vehicle control system 1 according to the first aspect of the present invention. As can be seen in FIG. 2, an air vehicle 2 comprises an integrated flight guarding control unit 3 which can be connected to a user interface 6 of a user U. The user interface 6 can be a cockpit user interface provided in a cockpit of the air vehicle 2. The user U can be for instance a pilot or a passenger of the air vehicle 2. The flight guarding control unit 3 can be connected or integrated in a flight control computer (FCC) 7 of the air vehicle 2 adapted to perform a flight control of the air vehicle 2 by controlling electronic and/or mechanical actuators 8 of the air vehicle 2. The flight guarding control unit 3 can be further connected to a communication navigation identification module 9 and to a navigation module 10 of the air vehicle 2. Further, the flight guarding control unit 3 can receive sensor data from sensors 11 of the air vehicle 2 as shown in the block diagram of FIG. 2.

The communication navigation identification module 9 can comprise a transponder unit XPDR and/or an automatic dependent surveillance broadcast unit ADSB. The communication navigation identification unit 9 further comprises at least one communication unit COM to perform bidirectional wireless communication with the ground station 4 and/or with other air vehicles 2.

The communication navigation identification unit 9 comprises a data link DL to provide data to the flight guarding control unit 3 of the air vehicle 2.

The navigation module 10 can comprise an air data altitude heading and reference system ADHRS and a global navigation satellite system GNSS as shown in FIG. 2.

In the embodiment of FIG. 2, the sensors can comprise a radar altimeter RALT and a forward-looking sensor FLS.

The air vehicle 2 can comprise a manned or an unmanned air vehicle 2. Further, the air vehicle 2 can be piloted or not piloted. In a possible implementation, the air vehicle 2 is a man-carrying vertical take-off and landing capable air vehicle which may be able to operate in closed proximity to other air vehicles 2 or obstacles such as buildings. A pilot flying the air vehicle 2 can be an onboard pilot or a remote pilot on ground communicating with a communication module of the air vehicle 2 via a wireless communication link WCL. The flight guarding control unit 3 integrated in the air vehicle 2 is adapted to intervene automatically with flight controls of the air vehicle 2 and keeps the air vehicle 2 during a flight movement within the three-dimensional spatial confines of the assigned air track AT to avoid collisions with other air vehicles and/or with other obstacles. The flight guarding control unit 3 as shown in the block diagram of FIG. 2 is adapted to predict continuously flight trajectories T of the air vehicle 2 flying along the assigned flight route FR within the confines of the flight route FR based on flight commands CMDs input by a pilot of the air vehicle 2 or generated by an autopilot of the air vehicle 2 and to modify and/or overrule the flight commands CMDs if the predicted flight trajectories T lead the air vehicle 2 outside the confines of the assigned flight route FR. In the embodiment shown in FIG. 2, a pilot may input flight commands CMDs via the user interface 6 which are automatically modified by the flight guarding control unit 3, if the flight trajectories T calculated by the flight guarding control unit 3 based on the received commands CMDs input by the pilot U will lead the air vehicle 2 outside the confines of the assigned flight route FR. The modified flight commands can be supplied by the flight guarding control unit 3 to the flight control computer (FCC) 7 which controls different kinds of actuators 8 of the air vehicle 2. The flight guarding control unit 3 continuously calculates a list of possible flight paths or trajectories T based on a range of possible pilot inputs (such as roll, pitch, draw, thrust) and calculates a predicted flight path or trajectory T based on the current pilot input and an air vehicle ride mode AVRM. The air vehicle ride mode AVRM can indicate limitations imposed by the flight guarding control unit 3 on a maximum negative and positive g-forces under consideration of human factors. The actuators 8 can comprise steering actuators such as flaps provided at wings or actuators providing thrust such as turbines or motors driving rotating blades.

As can be seen in FIG. 2, the ground station 4 comprises a communication module, an automatic dependent surveillance broadcast unit ADSB and a data link unit DLU to provide a wireless communication link WCL with air vehicles 2 within a fly zone assigned to the respective ground station 4. The control centre 5 can comprise an air management system AMS. The air management system AMS can provide a visualization to an operator which can be used to interact with the air vehicles 2.

A flight control intervention constraint level, fciC-L, applied by the flight control guarding unit 3 integrated in the air vehicle, AV, 2 can be derived by a trained artificial intelligence module, AIM, in particular by a trained artificial neural network, ANN, of the control centre 5 shown in FIG. 2 based on data received by the control centre 5 via a wireless communication link from the air vehicle, AV, 2. The data received from an air vehicle, AV, 2 by the control centre 5 via the ground sation 4 is evaluated by the trained artificial intelligence module, AIM, of the control centre 5 in real time to derive automatically an updated flight control intervention constraint level, fciC-L, returned to the flight guarding control unit 3 of the respective air vehicle 2 via the ground station 4 and the wireless communication link WCL and used by the flight guarding control unit 3 to intervene automatically with flight controls of the respective air vehicle 2 according to the returned updated flight control intervention constraint level, fciC-L.

The data evaluated by the artificial intelligence module, AIM, of the control centre 5 comprises in a possible implementation data reflecting the momentary operation behaviour of a pilot or user U of the air vehicle 2, in particular flight control commands, CMDs, input by the pilot or user U via the cockpit user interface 6 of the air vehicle 2 shown in FIG. 2 and image data of the pilot or user U provided by a camera placed in a cockpit of the air vehicle 2.

Figure 3:
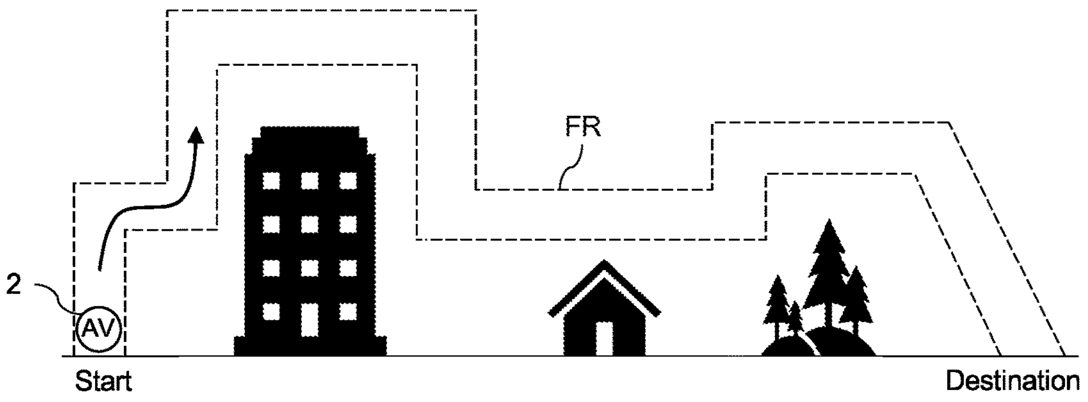
FIG. 3 shows schematically an example of a flight route assigned to an air vehicle according to a calculated flight route plan for an air vehicle control system according to the first aspect of the present invention.

FIG. 3 shows an example to illustrate the air vehicle control system 1 according to the first aspect of the present invention. In the illustrated example of FIG. 3, an air vehicle 2 performs a flight movement within the three-dimensional spatial confines of an assigned flight route FR from a start position to a destination position. In the illustrated example, the air vehicle 2 moves in a near-ground airspace, e.g. a class G airspace. As can be seen in the example of FIG. 3, along the flight route FR, there are some obstacles such as houses or trees. The air vehicle 2 is kept during its flight movement within the dynamic three-dimensional spatial confines or virtual boundaries B of the assigned flight route FR to avoid collisions with other air vehicles and to avoid collisions with the obstacles, i.e. the buildings and the trees. The flight route FR is assigned within the available airspace to the air vehicle 2 according to the calculated and updated flight route plan FRP.

Figure 8:
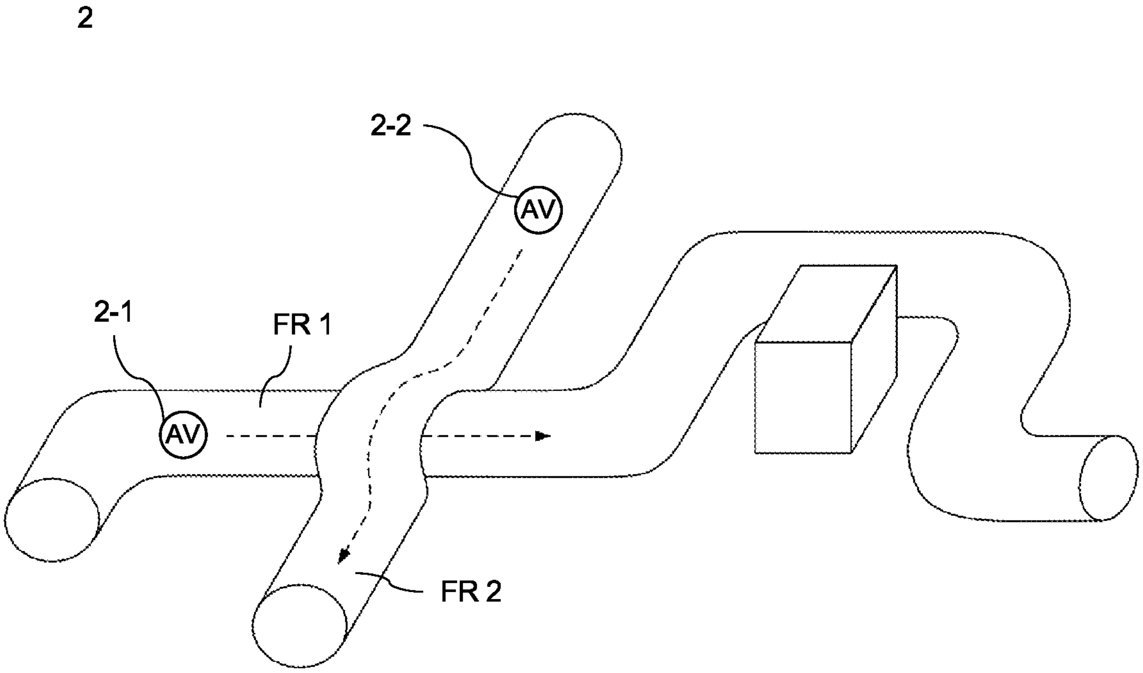
FIG. 8 shows a further schematic diagram for illustrating the operation of an air vehicle control system according to the third aspect of the present invention.

FIG. 8 shows a further example for illustrating the operation of the air vehicle control system 1 according to the present invention. In the illustrated example, in the two flight routes FR1, FR2, two air vehicles 2-1, 2-2 are crossing each other wherein the first air vehicle 2-1 is given priority over the other air vehicle 2-2. Accordingly, the changed flight route FR2 for the low-priority air vehicle 2-2 is bent around the flight route FR1 of the air vehicle 2-1 with higher priority. In a possible embodiment, the two air vehicles 2-1, 2-2 approaching each other in the airspace may dynamically negotiate their flight routes FR according to the current flight situation and may notify the control centre 5 about the negotiation result. The control centre 5 can then recalculate in real time the flight route plan FRP and perform an update of the assigned flight routes FR according to the negotiation results. Only after the flight guarding control unit 3 of the air vehicles 2 has received the confirmation of the reassignment and/or change of the flight route FR from the control centre 5, it will take the flight path of the reassigned or changed flight route FR.

In an alternative embodiment four-dimensional air tracks ATs can be used having also a time dimension t. In a possible embodiment of the air vehicle control system 1 the air track (AT) associated with a flight route (FR) of the calculated and updated flight route plan, FRP, and assigned by the air vehicle control system 1 to an air vehicle, AV, 2 forms a four-dimensional air track (AT) consisting of a sequence of virtual air track segments (ATS) connected with each other seamlessly along the air track (AT) belonging to the flight route (FR). The four dimensional air track (AT) comprises three space dimensions (x,y,z) formed by a three-dimensional airspace corridor or tunnel within spatial confines of the air track segments (ATS) of the four dimensional air track (AT) assigned to the air vehicle, AV, according to the calculated and updated flight route plan, FRP, and comprises a time dimension (t) formed by a sequence of travel time slots, TTS, calculated and assigned dynamically by the air vehicle control system 1 to an associated sequence of virtual air track segments (ATS) of said four dimensional air track (AT). The virtual air track segments (ATS) of the four-dimensional air track (AT) are activated sequentially during their associated travel time slots, TTS, along the respective flight route (FR) assigned to the air vehicle, AV, 2 according to the calculated and updated flight route plan, FRP. In this embodiment it is also possible that crossing or intersecting flight routes FR such as flight routes FR1, FR2 illustrated in FIG. 8 having at least one overlapping air track segment ATS may stay as they are without change in space as long as the travel time slots, TTS, assigned to the overlapping airtrack segments ATSs are different thus avoiding a collision of the two air vehicles, AVs, 2-1, 2-2 in time.

The use of four-dimensional air tracks, ATs, has the significant advantage that the density of flight routes FR assignable within the available controlled airspace can be increased. Further four-dimensional air tracks, ATs, provide more flexibility for assignment of flight routes FR within the available controlled airspace.

Figure 9:
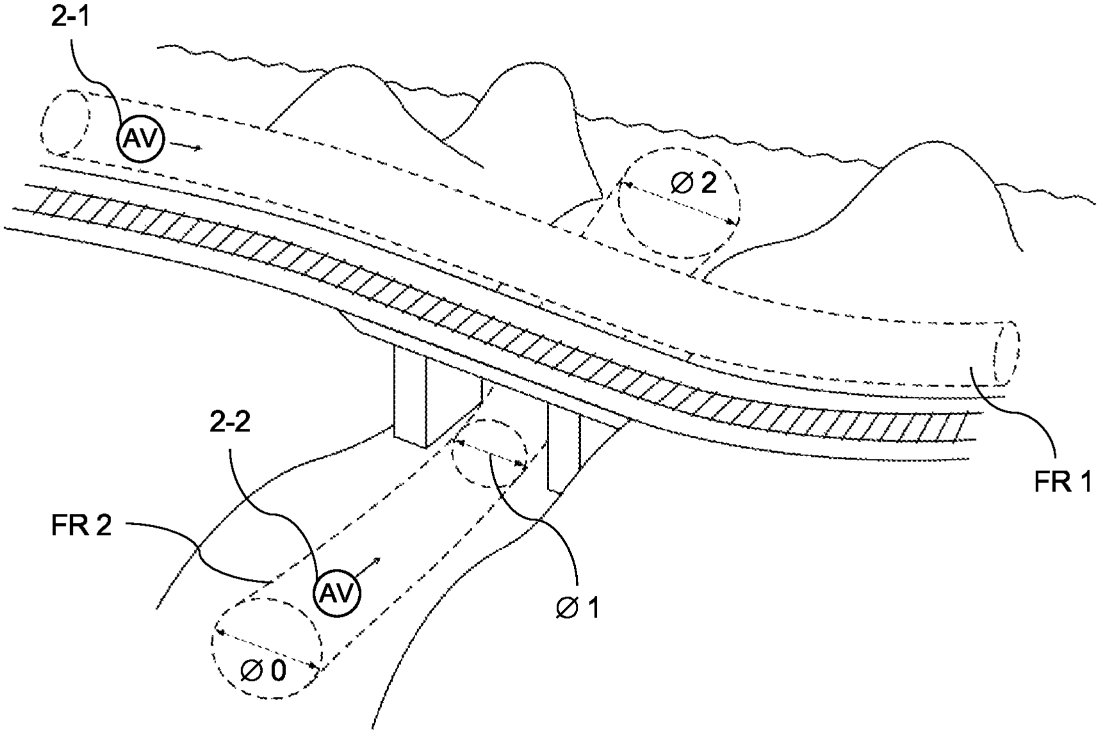
FIG. 9 shows schematically a further example for illustrating the operation of an air vehicle control system according to the first aspect of the present invention.

FIG. 9 shows a further example for illustrating the operation of an air vehicle control system 1 according to the first aspect of the present invention. The flight routes FR calculated by the control centre 5 can make use of the topology of the landscape to facilitate navigation of the air vehicle 2 along the associated air track AT of the flight route FR. The control centre 5 comprises a processor adapted to calculate and update the flight route plan FRP depending on flight planning criteria FPC including landscape data. In the illustrated example of FIG. 9, a first air vehicle 2-1 performs a flight movement within the spatial confines of the flight route FR1 following train rails. The other air vehicle 2-2 moves within the air track AT of the assigned flight route FR2 along a river beneath a railway bridge. As can also be seen from FIG. 9, the cross section of the calculated flight route FR2 is not constant but changes along the travel path. For instance, under the bridge, since there is not much available space, the cross section of the calculated flight route FR is smaller at this location than at other sections of the flight route FR2.

Figure 11:
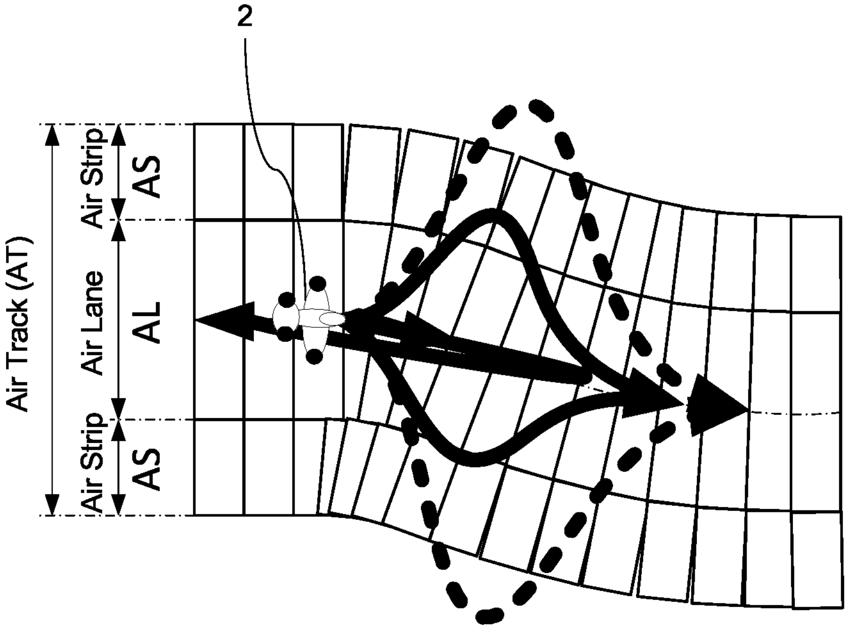
FIGS. 11, 12, 13 illustrate the calculation of recovery manoeuvres performed by a method and system according to the present invention.
Figure 12:
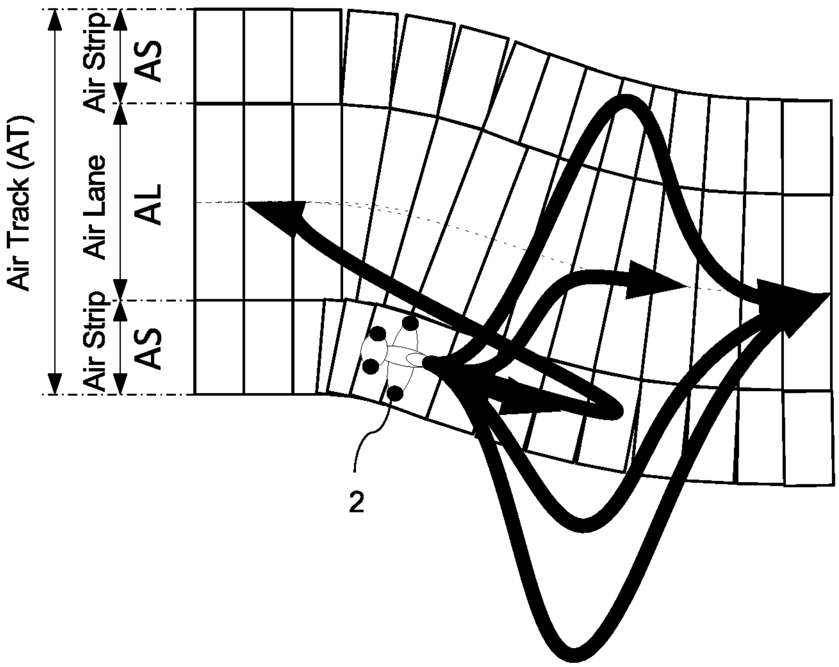
Figure 13:
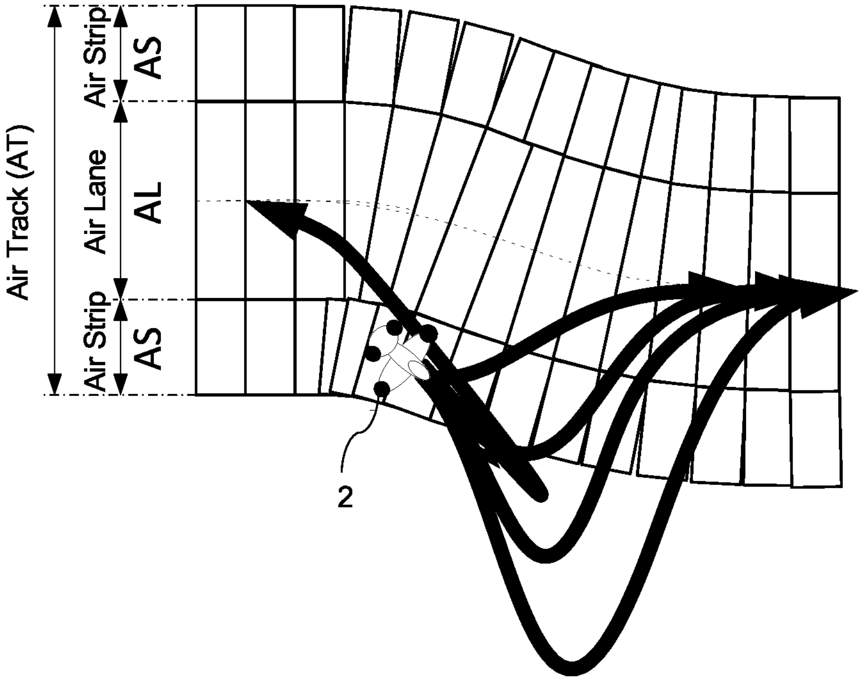

FIGS. 11, 12, 13 are provided to illustrate recovery manoeuvres calculated by the flight guarding control unit 3 integrated in an air vehicle 2 moving within an air lane AL of an assigned air track AT.

FIG. 11 shows a situation where the air vehicle 2 is within the air lane AL and safe recovery manoeuvres are available.

FIG. 12 shows a situation where the air vehicle 2 is already in an air strip AS but still within the outer confines of the assigned air track AT. There are still some safe recovery manoeuvres available, however, performing a safe recovery manoeuvre along a trajectory becomes gradually more difficult when the air vehicle 2 approaches the outer confines of the air strip AS and leaving the assigned flight route FR becomes more probable.

FIG. 13 shows a situation where the number of available safe recovery manoeuvre is reaching zero soon. In this situation, the flight guarding control unit 3 overrides pilot inputs and steers the air vehicle 2 back to the centreline CL in the middle of the air lane AL.

Figure 14:
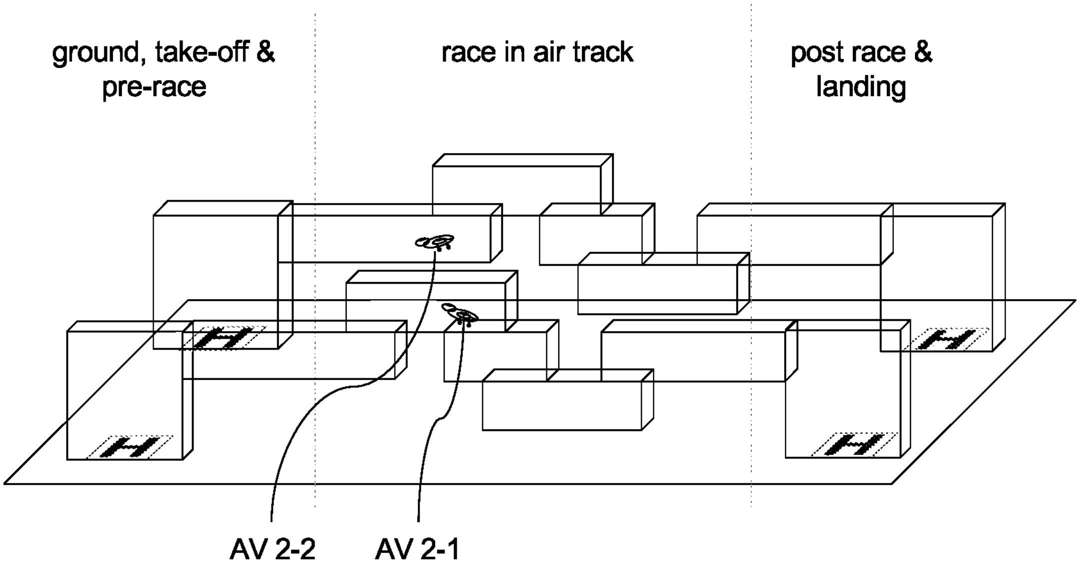
FIG. 14 illustrates a possible use case of an air vehicle control system according to the present invention.

FIG. 14 illustrates a possible use case of the air vehicle control system 1 according to the present invention. In a possible embodiment, the flight route plan FRP comprises an air race flight plan comprising flight routes FRs with associated air tracks ATs assigned within a limited airspace to competing air vehicles 2 participating in an air race event. In the illustrated example of FIG. 4, two air vehicles 2-1, 2-2 compete against each other by flying through assigned flight routes FRs from a start to a destination. The length of the calculated flight routes FRs is equal so that both air vehicles 2-1, 2-2 undergo a fair competition. The air vehicles 2-1, 2-2 can be operated by a pilot who can be onboard or on ground steering the air vehicle 2 from a remote position via a wireless link.

The air vehicle control system 1 according to the present invention can be used for different kinds of specified limited air spaces such as airspace above a city, a municipality, a region, a state or a country, or a competition airspace as illustrated in FIG. 14. The air vehicle control system 1 can be used for air race events enabling the flight of multiple air vehicles 2 concurrently without any risk of collisions.

The air vehicle control system 1 according to the present invention can also be used in digital gaming use cases, for instance a video game operator can control remotely a physical air vehicle 2 with or without passenger through a virtual or physical parcours or race. There can also be a setup where the pilot of the air vehicle 2 is physically flying or where the pilot's input gets translated into a video game. User experience can further be enhanced by the use of virtual reality or of augmented reality headsets, head-up display projections or other means of displaying a virtual environment.

The air vehicle control system 1 according to the present invention can also be used for training purposes, in particular at flight schools. The air vehicle control system 1 according to the present invention allows to lift system constraints gradually based on the increasing proficiency of the trained pilots providing an embedded experience superior to a conventional flight simulator used for training purposes. For instance, the candidates for a flight school can also be selected from participants which have received high scores, for instance from a video game.

The air vehicle control system 1 according to the present invention can also be programmed such that a particular data model of an air vehicle 2 or plane with all its characteristics can be simulated, including for example the use of virtual reality headsets that provide matching visuals.

The flight guarding control unit 3 integrated in the air vehicle 2 can be connected to a user interface adapted to visualize for a pilot, passenger and/or other interested party such as an operator or a spectator the flight route FR with the associated air track AT assigned to the respective air vehicle 2 according to the calculated and updated flight route plan FRP and/or to visualize other flight routes FRs with associated air tracks ATs assigned to other air vehicles 2 according to the calculated and updated flight route plan FRP. Accordingly, in an enhanced or virtual reality environment, users U, operators or spectators can see flight routes FRs and their boundaries in augmented reality. In an air race scenario, the pilot and/or the spectators can see the virtual boundaries and confines of the assigned air tracks ATs of the competing air vehicles 2 in an augmented or virtual reality showing the flight movement of the air vehicles 2 along the assigned air tracks ATs.

In any use case, if communication of the flight guarding control unit 3 of the air vehicle 2 and the at least one ground station 4 of the air vehicle control system 1 is interrupted, a contingency or emergency situation is detected requiring a handling of the situation according to a predefined escalation protocol. In a possible embodiment, the flight guarding control unit 3 integrated in the affected air vehicle 2 stops the intervention with the flight controls of the air vehicle 2 leaving full control to the pilot or autopilot of the respective air vehicle 2. In an alternative embodiment, the flight guarding control unit 3 calculates automatically a contingency manoeuvre which is performed by the air vehicle 2 under the control of the flight guarding control unit 3 based on sensor data provided by sensors of the air vehicle 2 to overcome the detected contingency situation.

In a possible embodiment, if the wireless communication link WCL to the ground station 4 is interrupted, the communication module 10 of the air vehicle 2 can automatically set up a wireless communication link WCL with other air vehicles 2 in its vicinity and may use the communication modules of these air vehicles 2 as repeater modules to establish a communication link with the ground station 4 of the air vehicle control system 1. Further, if the affected air vehicle 2 is piloted, the pilot may communicate for instance via radio with the ground station 4 directly to solicit the transmission of necessary data to calculate the contingency manoeuvre, especially if this contingency manoeuvre requires leaving the current assigned air track AT.

Another contingency situation where the flying capabilities of an air vehicle 2 are affected, the flight guarding control unit 3 of the air vehicle 2 can notify the control centre 5 about the contingency situation and its causes and request a reassignment or change of its current assigned flight route FR. The flight capabilities of the air vehicle 2 can be affected and reduced for instance if power supply is reduced or if the air vehicle 2 runs for instance out of fuel. In case that the air vehicle 2 runs out of battery and/or fuel a flight route FR change request is sent via the ground station 4 to the control centre 5 triggering an immediate recalculation of the flight route plan FRP, for instance to receive a more direct flight route FR to the original destination or for getting a flight route assignment of an alternative flight route FR to a backup destination. Different monitored parameters or observed constraints C can trigger a flight route change request. These parameters include for instance battery levels and/or weather conditions observed by sensors integrated in the air vehicle 2. Further, the payload carried by the air vehicle 2 can trigger a flight route reassignment or change request transmitted by the flight guarding control unit 3 of the air vehicle 2 to the control centre 5 of the system 1. Further, defects or technical limitations of components of the air vehicles 2 relevant for the performance of the flight movement may trigger a flight route reassignment request or a flight route change request.

The flight guarding control unit 3 integrated in an air vehicle 2 is adapted to predict continuously flight profiles for the collected data by calculating possible flight trajectories T and corridor boundaries. The air vehicle control system 1 can apply the principle of virtual air track AT boundaries or soft gravity. The flight guarding control unit 3 is capable of predicting breaches of the air track AT boundaries, unsafe flight conditions, collisions and other unsafe or undesired flight situations. The flight guarding control unit 3 is able to calculate a list of safe recovery manoeuvres to avoid a breach of the air track boundaries B taking into account the capabilities of the air vehicle 2 and the context. The flight guarding control unit 3 interferes with the flight controls at the latest when only one safe manoeuvre is left to be executed and the execution of this recovery manoeuvre has to be performed immediately to keep the air vehicle 2 safe in the context of the currently observed parameters including but not limited to a maximum angle of attack or a maximum acceleration envelope.

In a possible embodiment, the level of constraints C provided by the system 1 is variable, fluid and adaptable and can be assigned gradually from fully automatic and autonomous flight without any intervention to full freedom of pilot control within the safety parameters or limits of the system 1 whereby it is ensured that the air vehicle 2 stays always within the confines of the assigned air track AT and no unsafe flight manoeuvres are executed. For example, an aerodynamic airflow stall must be avoided where the flight capabilities of the air vehicle 2 may be insufficient or a pilot may be exposed to accelerations beyond a safe and comfortable level as set by the air vehicle control system 1, the pilot, a passenger or any other third party. Accordingly, in a preferred embodiment, the air vehicle control system 1 not only performs interventions when the air vehicle 2 starts to leave the confines of the assigned air track AT but also the input flight commands CMDs may lead to an unsafe unallowed flight situation reducing the flight security.

A safe flying environment with a maximum desired freedom is enabled. The level of constraints C can range from fully autonomous point-to-point transport (e.g. air taxi, virtual roller coaster) to flying freely within a virtual corridor where the system 1 only interferes if a breach of boundaries of a flight route corridor is detected or predicted.

The flight guarding control unit 3 of the air vehicle 2 is at any time aware of the air vehicle's position, speed, trajectory T, condition and other relevant constantly changing dynamic parameters by continuously and automatically taking in sensor data from a multitude of sensors or other data sources. These data sources can include the air vehicle's onboard sensors providing for instance the current GPS position of the air vehicle 2, the current air speed as well as accelerations of the air vehicle 2 in six degrees of freedom. The sensors can also provide the flight guarding control unit 3 with the current barometric height and an angle of attack. Further data to be processed comprise the mass, payload, acceleration capability, range and a battery charge status as well as potential damages and defects. Further, the pilot's capabilities and proficiency can be observed and evaluated thus influencing the extent of intervention performed by the flight guarding control unit 3 of the air vehicle 2. The flight guarding control unit 3 can also process relevant data received from other air vehicles in a relevant vicinity. Further, the flight guarding control unit 3 can evaluate geometric or landscape data of the surroundings received from sensors such as Lidar. Further, the flight guarding control unit 3 can receive relevant data via wireless links from other air vehicles or satellites. Some satellites can provide survey data, in particular weather data via a wireless link to the flight guarding control unit 3 of the air vehicle 2.

In a possible embodiment, some pre-processing of the huge amount of data can be performed on ground where more data processing capabilities are available. The preprocessed data are then transmitted from the ground station 4 of the air vehicle control system 1 via the wireless communication link WCL to a communication module 10 integrated in the receiving air vehicle 2.

The air vehicle control system 1 according to the present invention does enable an autonomous and automatic flight that does require neither the presence of a pilot onboard nor a remote pilot. The flight guarding control unit 3 of an air vehicle 2 is continuously aware of other air vehicles as well as of immobile or fixed obstacles in its proximity. The flight guarding control unit 3 may communicate continuously via a communication module 10 the current position of the air vehicle 2 and the flight route FR intended to be taken by the air vehicle 2. The flight guarding control unit 3 can change its assigned flight path according to a reassigned flight route FR. The control centre 5 performs a continuous recalculation of the flight route plan FRP to perform automatic and autonomous resolution of any potential conflicts or critical flight situations.

The control centre 5 of the air vehicle control system 1 can receive and process route assignment requests from a plurality of different actors and can confirm a guaranteed departure and arrival time together with preferred assigned flight routes FRs. The control centre 5 can receive and process data from distributed ground stations 4. The control centre 5 calculates and continuously updates four-dimensional trajectories for all participating air vehicles 2 in the airspace. The control centre 5 can calculate traffic advisories and resolution advisories for potential conflicts based on the calculated four-dimensional trajectories. The control centre 5 can further perform a capacity planning and management of the available airspace.

Figure 15:
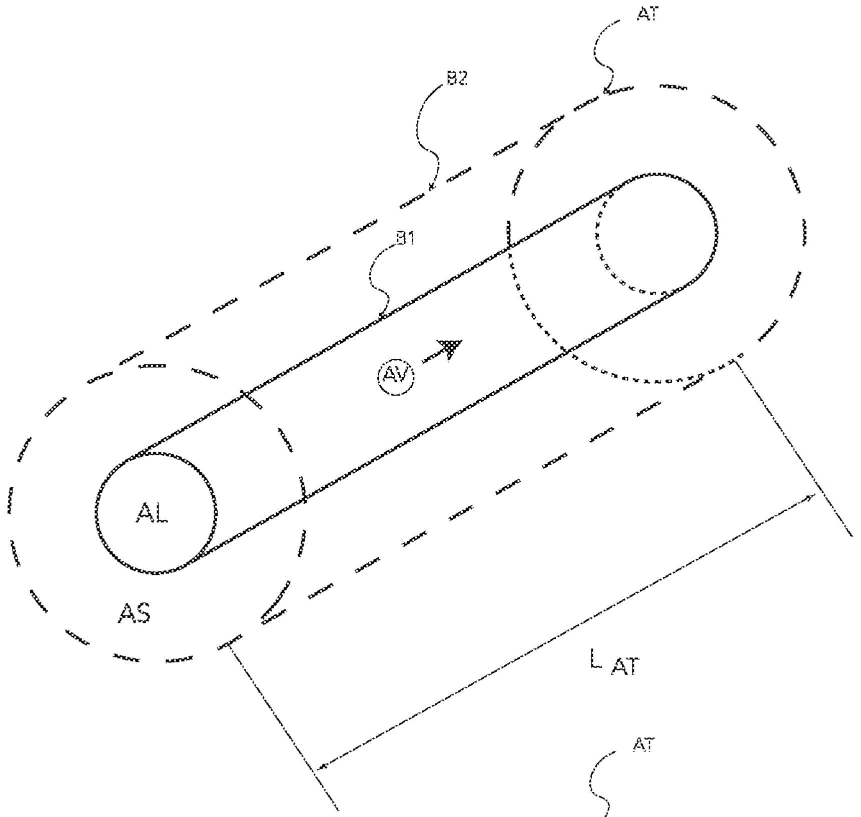
FIG. 15 to 19 illustrate schematically different embodiments of an air vehicle control system according to the present invention.
Figure 16:
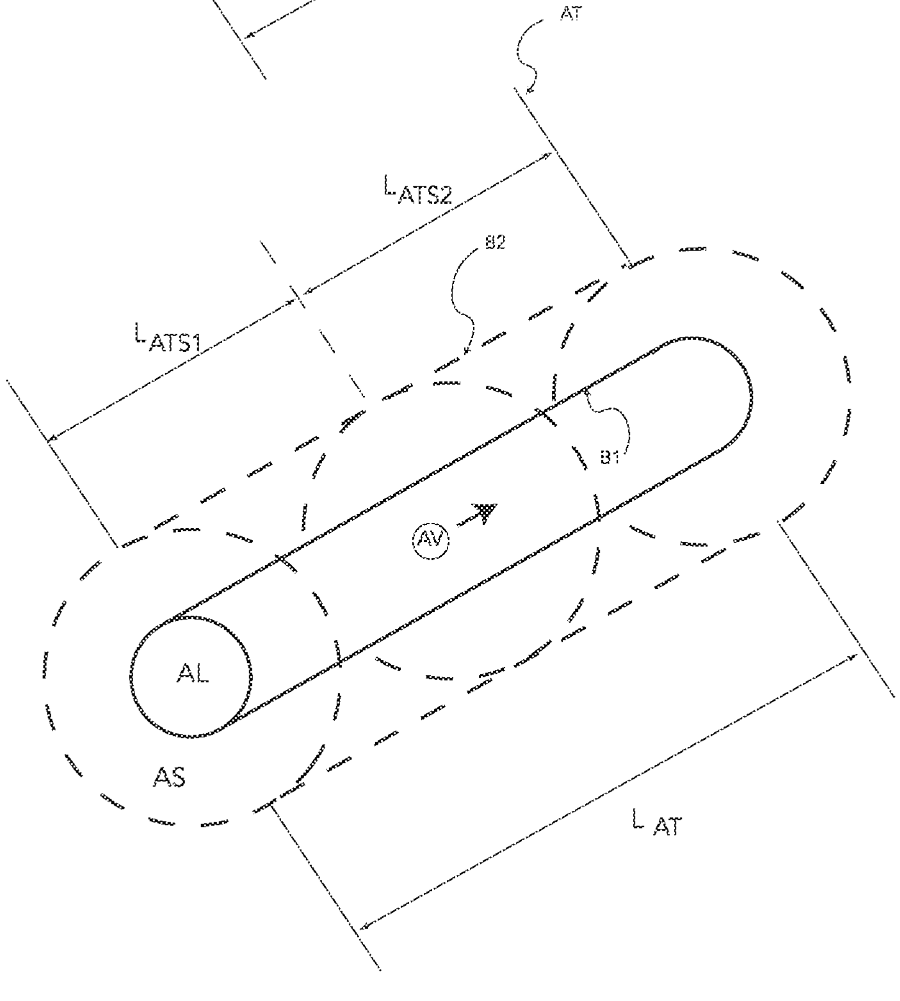

FIG. 15, 16 illustrate schematically different possible implementations of an air track AT used in an air vehicle control system according to the present invention. The air track AT comprises an air lane AL along an ideal centre line of travel CL which can be straight as shown in FIG. 15,16 or curved. The air lane is surrounded an all sides by a surrounding air strip AS. The air lane AL and the air strip AS are in a preferred embodiment both formed by rotational symmetrical volumes along the central axis formed by the straight or curved central line CL. In the embodiment shown in FIG. 15 the air track AT consist of a single air track segment ATS. In the embodiment shown in FIG. 16 the air track AT comprises more than one air track segments ATS each having a length L. Each airtrack segments AT can have its associated virtual boundaries B1,B2 as also shown in the example illustrated in FIG. 17. The length L of each air track segment ATS may vary depending on the use case and depending on the type and speed of the air vehicle AV 2 travelling along the assigned air track AT. In an urban environment the dimensions of the air track segment ATS can be meters, especially if the air vehicle AV 2 is a small drone (transporting e.g. a packet) with a comparatively low velocity v whereas for a commercial huge air plane AV 2 with a high velocity V travelling from a start position in a first continent (e.g. Europe) to a destination position a second continent (e.g. America) the length L of each air track segment ATS of the air track AT assigned to the air plane can be hundreds or even thousands of kilometres or miles. The length L of each air track segment ATS can be pre-set, i.e. static, or adaptable, i.e. variable. The length L of the air track segment ATS may increase along with the velocity v of the air vehicle AV. In any case the length L of each air track segment ATS of any air track AT associated with a flight routes FR can be calculated by a processing unit of the control centre 5 when calculating and updating the deterministic flight route plan FRP. Whereas a length L of each air track segment ATS depends mostly on the speed and type of the air vehicle AV 2 the spatial dimension virtual boundaries B1,B2 of the air track segment ATS depend to a large extent on other constraints C, in particular the flight control intervention constraint fciC set for the air vehicle AV 2 and a pilot capability constraint, fcapC, of the pilot flying the air vehicle AV. For an unexperienced pilot the calculated virtual boundaries B1,B2 tend to be smaller thus resulting in a narrower air track segment ATS.

Figure 17:
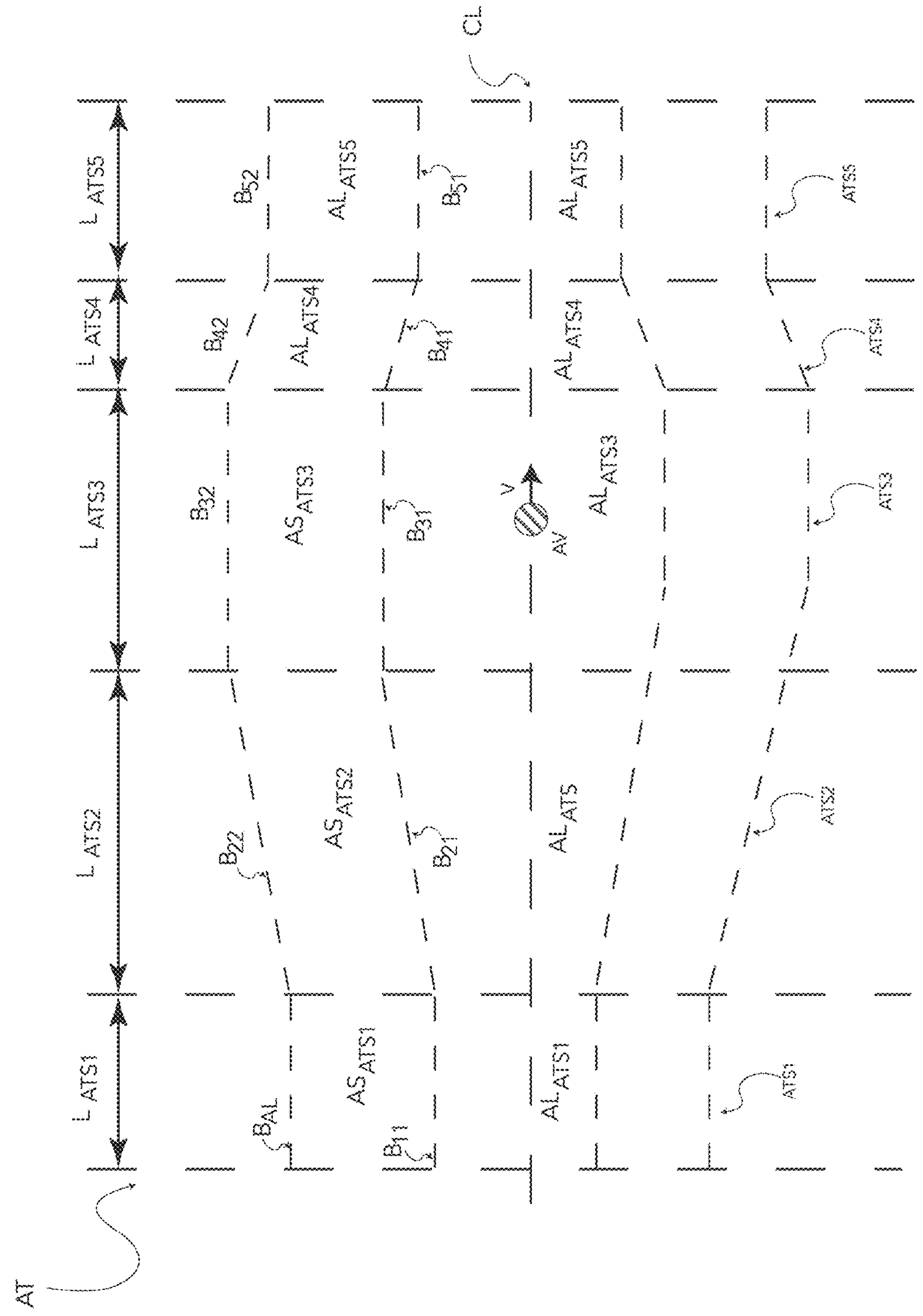

The shape of the air track segment ATS may vary depending on the use case. As shown in the schematic diagram of FIG. 17 illustrating a cross section through an air track AT consisting of five air track segments ATSs the air track segments ATS can be for instance cylindrical (ATS1, ATS3, ATS5) or conical (ATS2, ATS4) around the centre line CL. The air lane AL and the surrounding air strip AS can become wider (e.g. at ATS 3) in a region with less external constraints C, in particular fewer mobile or immobile obstacles (e.g. when travelling over an ocean) or less observed air traffic. Other shapes for an air track segment ATS are possible. For example, a loop shaped air track segment ATS can be placed by the flight control centre 5 at the end of the air track AT of an assigned flight route FR located above a destination position formed by an airport or by a drone landing platform on the roof of a skyscraper to allow waiting flight rounds of an approaching air vehicle AV as long as the destination position is occupied by another landed air vehicle AV.

The air vehicle control system 1 comprises in a preferred embodiment a common distributed time base or time reference system used to provide discrete travel time slots TTS assigned by the control centre 5 of the air vehicle control system 1 to air track segments ATSs of air tracks ATs associated with flight routes (FRs) assigned to air vehicles 2 by the control centre 5 according to the current updated flight route plan FRP to indicate time periods where the respective air track segments ATS are occupied by the moving air vehicles 2 traveling along their respective air tracks (ATs) of the flight routes (FR) assigned to the air vehicles 2. An air track AT can be segmented on the fly into air track segments ATSs in real time according to the updated flight route plan FRP. Further each air tack segment ATS of an air track AT can be labelled in the flight route plan FRP on the fly in real time with its assigned travel time slot TTSi.

Figure 18:
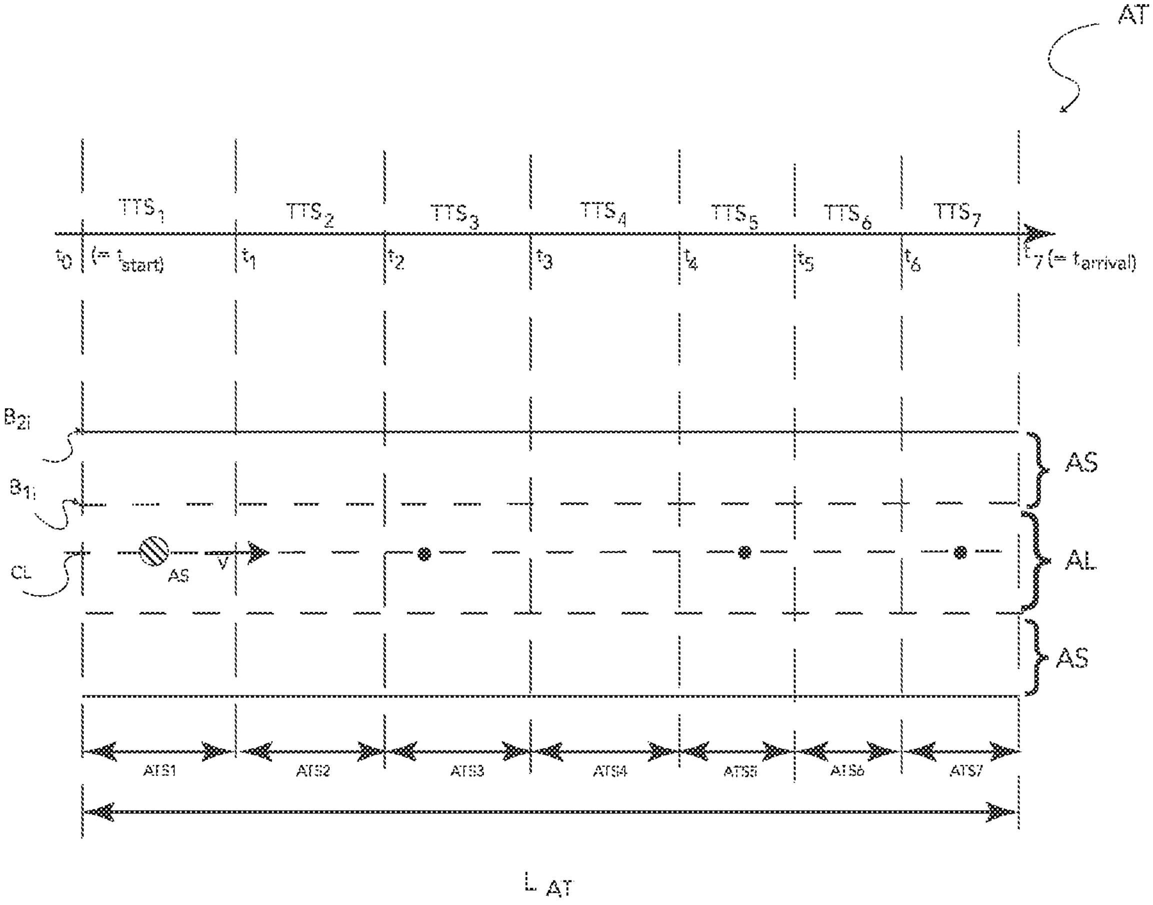

The air vehicle control system 1 can make use of a common time basis of the system such as a distributed time clock CLK or time reference signal. Each air track segment ATS has in this embodiment an assigned time travel slot TTS as illustrated in FIG. 18. The travel time between the start time at the start position and the arrival time at the destination position is divided into the travel time slots TTSs assigned by the control centre 5 after calculation and update of the flight route plan FRP along with the air track AT and its ATSs to the air vehicle AV 2. At any travel time slot TTL of the system not more than a single air vehicle AV 2 shall be travelling in an air space volume occupied by an air track segment ATS assigned by the control centre 5 to said air vehicle AV.

Figure 19:
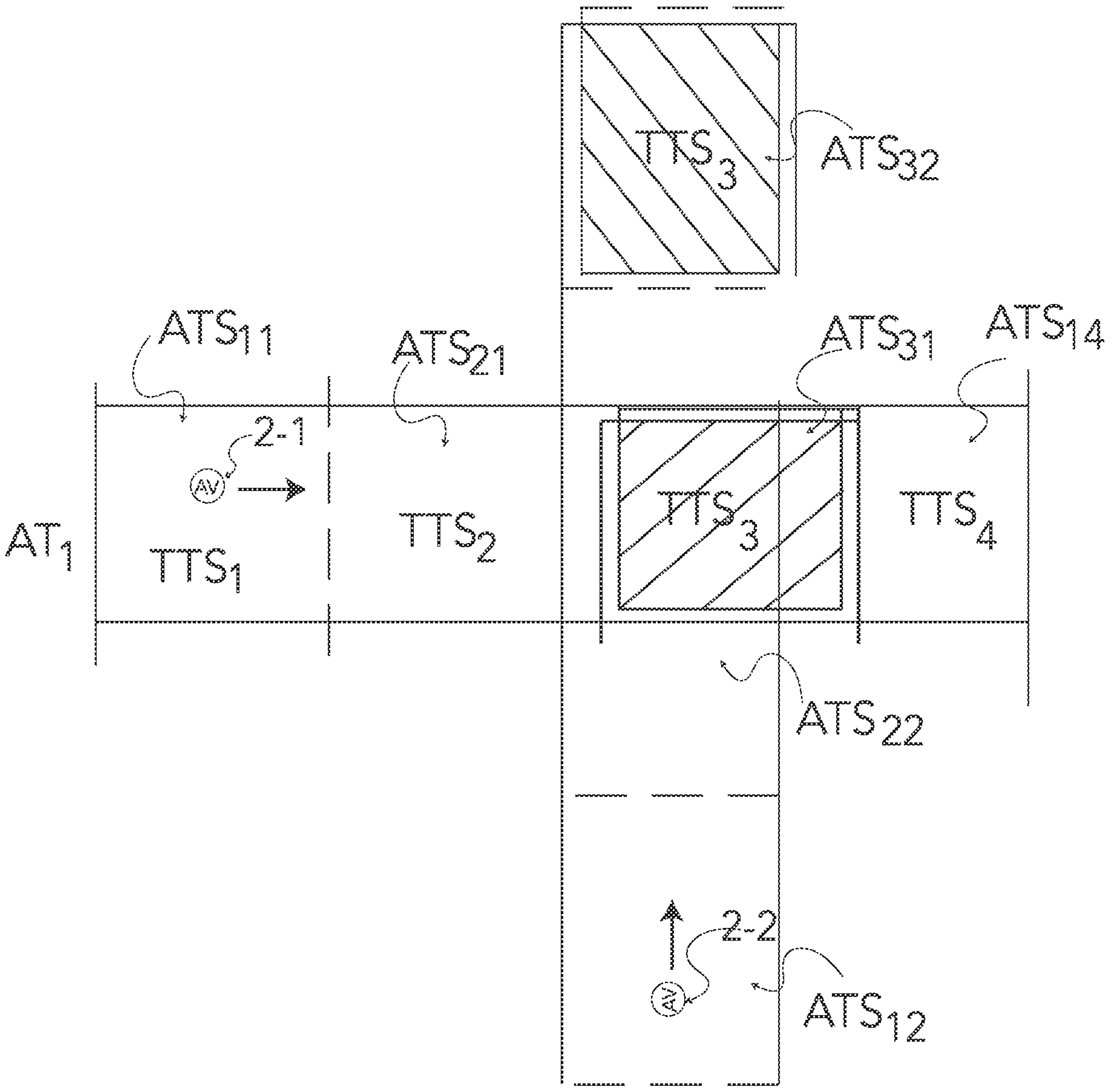

FIG. 19 shows a simple example where the air tracks AT1 and AT2 of two air vehicles AV 2-1, 2-2 cross each other. At travel time slot TTS3 according to the time basis of the system the first air vehicle AV1 will be at ATS 31 whereas the second air vehicle AV2 will be at ATS 32 so that no collision can occur despite the intersecting air tracks. In case that the flight control centre 5 and/or one of the two flight guarding control units 3-1, 3-2 of the air vehicles AV 2-1, 2-2 come to the conclusion that in the near future more than one air vehicle AV 2-1, 2-2 will be at any travel time slot TTSi in an air track segment ATS overlapping with another air track segment ATS of an air track AT assigned to the flight route FR of the other air vehicle and occupied by the other air vehicle at the travel time slot TTSi a potential collision is detected and an automatic recalculation of the flight route plan FRP is triggered to avoid the potential collision well ahead, i.e. several TTS before a danger may occur. For instance, if a potential collision at TTSi is detected by the control centre 5 or notified to the control centre 5 by one of the flight guarding control units 3-1, 3-2 a recalculation of the current flight route plan FRP can be automatically triggered at TTS (i-k), i.e. at k travel time slots before the collision could occur. One or both air tracks AT1, AT2 can be redirected in space by redirecting the respective centre travel line CL. Further the virtual boundaries B1, B2 of the air tracks AT1, AT2 might be narrowed down automatically because of the approaching other air vehicle. The control centre 5 can recalculate also the flight route plan FRP by changing the lengths L of the ATSs of the air tracks AT1, ATs and/or by reassigning the travel time slots TTLs of the air track segments ATSs of the air tracks AT1, AT2.

In a further embodiment the flight guarding control unit 3 of at least one of the two potentially colliding air vehicles 2-1, 2-2 will intervene automatically with the flight controls according the recalculated flight route plan FRP to avoid a collision. For instance, in the simple example illustrated in FIG. 19 the second air vehicle 2-2 passes the intersecting air space before air vehicle 2-1. At TTS3 the second air vehicle 2-2 has moved already past the intersection. However at TTS3 both air vehicles 2-1, 2-2 are still close to each other according to the current flight route plan FRP. To increase the security margin the flight guarding control unit 3-2 of the second air vehicle 2-2 may automatically increase the speed v2 of the second air vehicle AV 2-2 so that it does pass the intersection even earlier and to have at TTS3 a greater distance to the intersection. In the same manner the flight guarding control unit 3-1 may automatically intervene with the flight controls of the first air vehicle AV 2-1 to reduce the speed v1 of the first air vehicle AV 2-1 to reach the intersection later thus increasing the safety margin. In a preferred embodiment this is only performed by the flight guarding control units 3-1, 3-2 after having received an approval from the control centre 5 in return to a corresponding velocity change request. The velocity change or any other intervention into the flight controls by the flight guarding control unit 3 can also be initiated by the control centre 5 without a received request as a result of an updated flight rote plan FRP. The velocity changes or any other flight control interventions can also be negotiated between the flight guarding control units 3-1, 3-2 and then notified with corresponding requests to the control centre 5. The control centre 5 can either approve the flight control interventions requests received from the flight guarding control units 3-1, 3-2 to trigger these interventions or can reject these requests because of other information available to the control centre 5, in particular other constraints C, or in view of optimization criteria OC or flight planning criteria FPC.

The invention claimed is:

1. An air vehicle control system for operation of one or more air vehicles flying along flight routes assigned to the air vehicles by said air vehicle control system according to a flight route plan within a predefined airspace, said air vehicle control system comprising:

a control center having a processing unit adapted to calculate and update a deterministic flight route plan and being adapted to assign flight routes to the air vehicles according to the calculated and updated deterministic flight route plan, wherein the calculated and updated deterministic flight route plan comprises four-dimensional air tracks comprising virtual air track segments each having an interior air lane surrounded by an associated air strip, wherein each air track segment of the four-dimensional air track belonging to a flight route assigned by the control center to an air vehicle according to the calculated and updated deterministic flight route plan comprises a first virtual inner air track boundary between the interior air lane and the air strip surrounding the air lane and a second virtual outer air track boundary between the air strip and the exterior airspace forming the spatial confines of the air track, wherein the virtual air track boundaries and a virtual length of the air track segments of the four-dimensional air track are adjusted dynamically in real time during an update of the calculated flight route plan, wherein the air vehicle control system comprises a time reference system adapted to provide travel time slots assigned dynamically by the control center of the air control system to an associated sequence of virtual air track segments of said four dimensional air track and activated sequentially over time for the virtual air track segments of the four-dimensional air track along the respective flight route assigned to the air vehicle according to the calculated and updated deterministic flight route plan, and comprising flight guarding control units integrated in the air vehicles, wherein each flight guarding control unit integrated in the respective air vehicle is adapted to intervene automatically with flight controls of the air vehicle according to a flight control intervention constraint level of a flight control intervention constraint on the basis of a monitored flight status of the respective air vehicle such that the air vehicle is kept during a flight movement within dynamic spatial confines or air track boundaries of air track segments of the four dimensional air track belonging to the flight route assigned to the respective air vehicle to avoid collisions with other air vehicles or to avoid collisions with other obstacles in the predefined airspace.

2. The air vehicle control system according to claim 1, wherein the four dimensional air track associated with a flight route of the calculated and updated deterministic flight route plan and assigned by the control center of the air vehicle control system to an air vehicle consists of a sequence of virtual air track segments connected with each other seamlessly along the flight route, wherein the four-dimensional air track comprises:

three space dimensions (x, y, z) formed by a three-dimensional airspace corridor or tunnel within spatial confines of the air track segments of the four dimensional air track assigned to the air vehicle according to the calculated and updated deterministic flight route plan, FRP, and a time dimension (t) formed by a sequence of discrete travel time slots calculated and assigned dynamically by the control center of the air control system to an associated sequence of virtual air track segments of said four dimensional air track and activated sequentially over time for the virtual air track segments of the four-dimensional air track along the respective flight route assigned to the air vehicle according to the calculated and updated deterministic flight route plan.

3. The air vehicle control system according to claim 2, wherein a travel time between a start time at a start position and a stop time at a destination position is divided into travel time slots assigned by the control center after calculation and update of the flight route plan along with the air track and its air track segments to the air vehicle, wherein at any travel time slot not more than a single air vehicle is travelling in an air space volume occupied by an air track segment assigned by the control center of the air vehicle control system to said air vehicle.

4. The air vehicle control system according to claim 2, wherein the flight control center and the flight guarding control units integrated in the air vehicles are adapted to determine a potential collision and to trigger an automatic recalculation of the flight route plan if at any travel time slot an air track segment is overlapping with another air track segment of an air track assigned to the flight route of another air vehicle and occupied by the other air vehicle at the travel time slot.

5. The air vehicle control system according to claim 4, wherein the control center is adapted to perform a recalculation of the current flight route plan several travel time slots before a danger may occur if a potential collision is determined by the control center or notified to the control center by the flight guarding control units.

6. The air vehicle control system according to claim 4, wherein if a potential collision is determined the control center is adapted to recalculate the current flight route plan such that the air tracks belonging to the flight routes of the air vehicles are redirected in space by redirecting the respective central travel line and the air track boundaries of the air tracks are narrowed down automatically.

7. The air vehicle control system according to claim 4 wherein if a potential collision is determined the flight guarding control unit of at least one of the potentially colliding air vehicles is adapted to automatically intervene with the flight controls according to the recalculated flight route plan by changing the velocity of the air vehicle.

8. The air vehicle control system according to claim 1, wherein the air vehicle control system comprises the time reference system used to provide the travel time slots assigned by the control center of the air vehicle control system to the air track segments of four dimensional air tracks associated with flight routes assigned to the air vehicles by the control center according to the current calculated and updated deterministic flight route plan to indicate time periods where the respective air track segments are occupied by the air vehicles traveling along the four dimensional air tracks of the flight routes assigned to the air vehicles.

9. The air vehicle control system according to claim 1, wherein the flight guarding control unit of the air vehicle (2-1; 2-2) is adapted to intervene automatically with the flight controls of the air vehicle according to a pre-set or updated flight control intervention constraint level of the flight control intervention constraint indicating an extent of intervention of the air flight guarding control unit with the flight controls of the air vehicle and according to other constraints by modifying or overriding flight commands provided by a pilot or by an autopilot of the air vehicle in real time to change at least one physical operation parameter of the air vehicle according to the current flight control intervention constraint level of the flight control intervention constraint, wherein the modified commands are supplied by the flight guarding control unit to a flight control computer of the air vehicle which is adapted to control actuators of the air vehicle according to the modified flight commands.

10. The air vehicle control system according to claim 9, wherein the other constraints on which depends the extent of intervention of the flight guarding control unit integrated in the air vehicle comprise:

flying space constraints including real world physical flying space limitations or spatial confines and virtual flying space constraints;

flying time constraints, including travel time slots, TTS;

flight traffic constraints in particular, flight traffic densities, relative positions of the air vehicle to other air vehicles or to other static and dynamic obstacles; pilot capability constraints in particular a pilot proficiency of an on board pilot or of a remote pilot of the air vehicle;

flight capability constraints of the air vehicle including predetermined flight capabilities of the air vehicle or variable flight capabilities of the air vehicle derived from the monitored flight status of the air vehicle such that the air vehicle is always kept during its flight travel movement along its assigned flight route within the dynamic three-dimensional spatial confines or virtual air track boundaries of air track segments of the four-dimensional air track belonging to the respective assigned flight route based on the flight control intervention constraint; and external flight constraints, in particular weather conditions along the assigned flight routes, availability of take-off time slots at the start position and landing time slots at the destination positions, landscape data and/or predefined air traffic rules and/or other external parameters.

11. The air vehicle control system according to claim 9, wherein the other constraints on which depends the extent of intervention of the flight guarding control unit integrated in the air vehicle comprise:

pre-set constraints configured or pre-set at the air flight guarding control unit of the air vehicle or received by the flight guarding control unit of the air vehicle via a communication unit from a ground station of the air vehicle control system or from another air vehicle; and variable constraints derived from sensor data supplied by sensors of the air vehicle to the air flight guarding control unit integrated in the air vehicle and evaluated by a data processing unit or by a trained artificial intelligence module of the flight guarding control unit to adapt continuously the variable constraints or received by the flight guarding control unit integrated in the air vehicle via a communication unit from a ground station of the air vehicle control system or received from another air vehicle.

12. The air vehicle control system according to claim 11, wherein if communication of the air flight guarding control unit integrated in the air vehicle and the ground stations or the satellites of the air vehicle control system is interrupted or if another contingency situation is detected, the flight guarding control unit is adapted to either stop the intervention with the flight controls of the air vehicle leaving full control to the pilot or autopilot of the air vehicle in an autonomous flying movement or is adapted to calculate automatically an contingency manoeuvre performed by the air vehicle based on the pre-set flight control intervention constraint of the flight control intervention constraint under the control of the flight guarding control unit based on sensor data provided by on board sensors of the air vehicle to overcome the detected contingency situation.

13. The air vehicle control system according to claim 1, wherein the at least one flight control intervention constraint level of the flight control intervention constraint ranges from an autonomous level for minimal intervention to a fully automated level for maximum intervention, wherein the autonomous level for minimal intervention is adapted to provide a free autonomous flying movement of the air vehicle from a start position within the spatial confines of the calculated and updated flight route assigned to the air vehicle by the vehicle control system until a destination position, wherein the automated level for maximum intervention is adapted to provide a fully automated predetermined end-to-end flying movement of the air vehicle from a start position within the spatial confines of the calculated and updated flight route assigned to the air vehicle by the vehicle control system to a destination position, wherein a fully automated setting of allows full control for the air vehicle control system.

14. The air vehicle control system according to claim 1, wherein the processing unit of the control center is adapted to calculate and update the deterministic flight route plan continuously or event driven in response to an flight control intervention request received by the control center from a flight guarding control unit integrated in an air vehicle, wherein the control center is adapted to update the deterministic flight route plan depending on the current monitored flight status of the air vehicles on the basis of predefined flight planning criteria and on the basis of predefined optimization criteria wherein the deterministic flight route plan comprises a plurality of flight routes with associated four dimensional air tracks assigned by the control center to the different air vehicles.

15. The air vehicle control system according to claim 14, wherein the optimization criteria used by the processing unit of the control center of the air vehicle control system to calculate, update and optimize the deterministic flight route plan for an individual air vehicle for a specific fleet of air vehicles or for the entire airspace controlled by the air vehicle control system comprise:

environment related optimization criteria including, greenhouse gas emission or noise produced by certain components;

safety related optimization criteria;

efficiency related optimization criteria including the energy consumption of certain components; and social related optimization criteria, such as privacy, data protection, communications with emergency services in the event of a health emergency on-board, a cyber/terrorist attack or a criminal misconduct.

16. The air vehicle control system according to claim 1, comprising at least one ground station connected via a communication network to the control center, wherein the ground station of the air vehicle control system is adapted to communicate the flight routes assigned by the control center to the different air vehicles directly or via at least one satellite to the air flight guarding control units integrated in the different air vehicles.

17. The air vehicle control system according to claim 1, wherein the air track segments of a four dimensional air track belonging to a flight route assigned to an air vehicle according to the calculated and updated deterministic flight route plan comprise virtual air track boundaries and a length as space dimensions calculated dynamically by the processing unit of the control center according to a formula or algorithm depending on set constraints which depend on variable constraints.

18. The air vehicle control system according to claim 1, wherein the four dimensional air track associated with a flight route assigned by the control center to the air vehicle according to the calculated flight route plan is adjusted during a flight movement of the air vehicle by recalculating and changing dynamically the virtual air track boundaries and/or the length of the air track segments of the respective four dimensional air track.

19. The air vehicle control system according to claim 1, wherein the air flight guarding control unit integrated in the air vehicle is adapted to predict continuously four dimensional flight trajectories of the air vehicle flying along the assigned flight route within the dynamic three-dimensional spatial confines or virtual air track boundaries of air track segments of the associated four dimensional air track based on flight commands input by a pilot of the air vehicle or generated by an autopilot of the air vehicle and is adapted to intervene with the flight controls of the air vehicle by modifying or overruling the flight commands if the predicted four dimensional flight trajectories lead the air vehicle outside the dynamic three-dimensional spatial confines of the four dimensional air track associated with the assigned flight route of the calculated and updated flight route plan.

20. The air vehicle control system according to claim 19, wherein the air flight guarding control unit integrated in the air vehicle is adapted to calculate continuously recovery manoeuvres to keep the air vehicle within the spatial confines of the air track segments of the four dimensional air track of the assigned flight route if the four dimensional flight trajectories predicted by the flight guarding control unit lead the air vehicle outside the dynamic spatial confines or virtual air track boundaries of the air track segments of the four dimensional air track of the flight route assigned to the air vehicle according to the calculated and updated deterministic flight route plan.

21. The air vehicle control system according to claim 1, wherein the control center of the air vehicle control system is adapted to assign the flight route with its associated four dimensional air track to the air vehicle according to the calculated flight route plan preflight in response to a flight route request before take-off of the respective air vehicle and is adapted to adjust the flight route during movement of the air vehicle within the spatial confines of the four dimensional air track belonging to the assigned flight route according to the updated deterministic flight route plan, wherein the control center of the air vehicle control system is adapted to communicate the updated flight route plan to the air vehicle directly through the at least one ground station of the air vehicle control system via a wireless communication link or indirectly via a satellite communication link.

22. The air vehicle control system according to claim 1, wherein the monitored flight status of the air vehicle comprises:

static physical operation parameters of the air vehicle including a size and geometry of the air vehicle, a weight of the air vehicle and operation capabilities of the air vehicle;

dynamic physical operation parameters of the air vehicle including a current position, heading, speed, acceleration, barometric height, angle of attack and impulse of the air vehicle in three spatial dimensions over time; and logic operation parameters of an air vehicle including a flight phase status of the air vehicle during different flight phases of the air vehicle.

23. The air vehicle control system according to claim 1, wherein the flight guarding control unit integrated in the air vehicle is connected to a user interface adapted to visualize for a pilot, passenger and/or other interested party the flight route with the associated air track assigned to the respective air vehicle according to the calculated and updated deterministic flight route plan, FRP, and/or is adapted to visualize other flight routes with associated air tracks assigned to other air vehicles according to the calculated and updated deterministic flight route plan.

24. The air vehicle control system according to claim 1, wherein the flight guarding control unit integrated in the air vehicle is adapted to provide a user of training feedback via a user interface to a pilot on-board the air vehicle or at a ground station of the air vehicle control system, wherein the user interface is adapted to blend a real world flight scenario with a virtual world flight scenario by means of an augmented reality, AR, a virtual reality, VR, user headset placed on a head of a user participating in a video game or being schooled by a flight training program, wherein the flight guarding control unit is adapted to interfere with the pilot controls to any degree necessary to balance freedom of pilot control and safety of operation, wherein an observed increase in the flight proficiency of a student or pilot results automatically in a decrease in the level of interference, and wherein the air vehicle control system is adapted to learn new information with every flight, thereby gradually improving vehicle behaviour and sensitivity to erratic pilot manoeuvres.

25. The air vehicle control system according to claim 1, wherein an on-board or remote pilot or passengers are equipped with Virtual Reality, VR, headsets that are adapted to display information, early warning, avoidance of startling situations, by showing the planned flight route so that the visual and inner ear balance sensory inputs are matched to avoid nausea or to avoid startling the passengers due to surprising changes of course or acceleration.

26. The air vehicle control system according to claim 1, wherein the intervention with flight controls of an air vehicle is performed by the flight control guarding unit integrated in the air vehicle automatically on the basis of a flight route with an associated air track assigned to the air vehicle by the control center of the air vehicle control system according to the deterministic flight route plan calculated and updated by the control center depending on at least one local or global constraint and depending on the current monitored flight status of the air vehicle monitored by the flight guarding control unit such that the air vehicle is kept during its flight movement along its assigned flight route within the dynamic three-dimensional spatial confines or virtual air track boundaries of air track segments of the four dimensional air track belonging to the respective assigned flight route without any human intervention or with human intervention as defined by the flight control intervention constraint set for the flight guarding control unit integrated in the respective air vehicle.

27. The air vehicle control system according to claim 1, wherein the flight control intervention constraint applied by the flight control guarding unit integrated in the air vehicle is set or adjusted by the control center in real time according to the calculated or updated deterministic flight route plan and communicated by the control center to the flight control guarding unit integrated in the air vehicle via a communication link, wherein the flight control intervention constraint level of the flight control intervention constraint applied by the flight control guarding unit integrated in the air vehicle is derived by a trained artificial intelligence module in particular by a trained artificial neural network of the control center based on data received by the control center via a wireless communication link from the respective air vehicle.

28. The air vehicle control system according to claim 27, wherein the trained artificial intelligence module of the control center is adapted to evaluate data received by the control center from an air vehicle in real time to derive automatically an updated flight control intervention constraint level returned to the flight guarding control unit integrated in the respective air vehicle, wherein the flight guarding control unit is adapted to intervene automatically with flight controls of the respective air vehicle according to the returned updated flight control intervention constraint level.

29. The air vehicle control system according to claim 28, wherein the data evaluated by the trained artificial intelligence module of the control center comprises data reflecting the momentary operation behaviour of a pilot of the air vehicle, in particular flight control commands input by the pilot via a cockpit user interface of the air vehicle and image data of the pilot provided by a camera placed in a cockpit of the air vehicle.

30. The air vehicle control system according to claim 1, wherein the air vehicles comprise piloted air vehicles and/or unpiloted air vehicles, in particular, piloted or unpiloted drones, air planes, aircrafts or helicopters.

31. A computer implemented method for controlling flight movements of a plurality of different air vehicles within an available airspace, the method comprising the steps of:

calculating and updating by a control center of an air vehicle control system a deterministic flight route plan depending on a current flight status of the air vehicles on the basis of predefined flight planning criteria and on the basis of predefined optimization criteria wherein the calculated and updated deterministic flight route plan comprises a plurality of flight routes with associated four-dimensional air tracks comprising virtual air track segments each having an interior air lane surrounded by an associated air strip, wherein each air track segment of the four-dimensional air track belonging to a flight route comprises a first virtual inner air track boundary between the interior air lane and the air strip surrounding the air lane and a second virtual outer air track boundary between the air strip and the exterior airspace forming the spatial confines of the four-dimensional air track, wherein the virtual air track boundaries and a virtual length of the air track segments of the four-dimensional air track are adjusted dynamically in real time during an update of the calculated flight route plan, assigning by the control center of the air vehicle control system flight routes to the different air vehicles according to the calculated and updated deterministic flight route plan, wherein travel time slots provided by a time reference system of the air vehicle control system are assigned dynamically by the control center of the air vehicle control system to an associated sequence of virtual air track segments of said four dimensional air track and activated sequentially over time for the virtual air track segments, of the four-dimensional air track along the respective flight route assigned to the air vehicle according to the calculated and updated deterministic flight route plan, communicating by at least one ground station of the air vehicle control system the assigned flight routes to air flight guarding control units integrated in the different air vehicles; and performing by the air flight guarding control units integrated in the air vehicles automatically interventions with flight controls of the respective air vehicles according to a flight control intervention constraint level of a flight control intervention constraint and according to other pre-set or derived constraints on the basis of the current monitored flight status of the air vehicles monitored by the flight guarding control units such that each air vehicle is kept during its flight movement along its assigned flight route within the dynamic spatial confines or virtual air track boundaries of air track segments of a four-dimensional air track belonging to the respective assigned flight route to avoid collisions with the other air vehicles or to avoid collisions with other obstacles in the airspace.

* * * * *